(12) United States Patent
Borst et al.

(10) Patent No.: US 8,648,026 B2
(45) Date of Patent: Feb. 11, 2014

(54) COMPOSITION COMPRISING AN ALKANESULFONIC ACID FOR DISSOLVING AND/OR INHIBITING DEPOSITION OF SCALE ON A SURFACE OF A SYSTEM

(71) Applicant: BASF SE, Ludwigshafen (DE)

(72) Inventors: Joseph P Borst, Plymouth, MI (US); Keith Hirsch, Canton, MI (US); Stephen F Gross, Rockwood, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/688,819

(22) Filed: Nov. 29, 2012

(65) Prior Publication Data

US 2013/0137622 A1 May 30, 2013

Related U.S. Application Data

(60) Provisional application No. 61/565,090, filed on Nov. 30, 2011.

(51) Int. Cl.
*C11D 7/08* (2006.01)
*C11D 1/88* (2006.01)

(52) U.S. Cl.
USPC ........... 510/253; 510/188; 510/218; 510/219; 510/490; 510/254; 510/363; 510/401; 510/421; 510/422; 510/495

(58) Field of Classification Search
USPC ......... 510/188, 218, 219, 253, 254, 363, 401, 510/421, 422, 495, 490
See application file for complete search history.

(56) References Cited

U.S. PATENT DOCUMENTS

| | | | | |
|---|---|---|---|---|
| 4,662,999 A | * | 5/1987 | Opaskar et al. | 205/254 |
| 4,810,337 A | * | 3/1989 | Newby | 205/98 |
| 6,531,629 B1 | | 3/2003 | Eiermann et al. | |
| 2004/0241099 A1 | * | 12/2004 | Popp et al. | 424/45 |
| 2007/0203049 A1 | * | 8/2007 | Thomson | 510/421 |
| 2008/0161591 A1 | | 7/2008 | Richards | |
| 2010/0331228 A1 | | 12/2010 | Juhue et al. | |
| 2011/0124533 A1 | * | 5/2011 | Notte et al. | 507/235 |
| 2012/0260938 A1 | * | 10/2012 | Zack et al. | 134/5 |

FOREIGN PATENT DOCUMENTS

| | | |
|---|---|---|
| EP | 0790296 A1 | 8/1997 |
| FR | 2774371 A1 | 8/1999 |
| FR | 2920435 A1 | 3/2009 |
| FR | 2955332 A1 | 7/2011 |
| WO | WO 0077138 A1 | 12/2000 |
| WO | WO 2009124314 A1 | 10/2009 |

OTHER PUBLICATIONS

English language abstract and machine-assisted translation for FR 2774371 extracted from espacenet.com database on May 7, 2013, 16 pages.
English language abstract and machine-assisted translation for FR 2920435 extracted from espacenet.com database on May 7, 2013, 20 pages.
English language abstract and machine-assisted translation for FR 2955332 extracted from espacenet.com database on May 9, 2013, 20 pages.
International Search Report for Application No. PCT/IB2012/002815 dated Apr. 17, 2013, 4 pages.

* cited by examiner

*Primary Examiner* — Charles Boyer
(74) *Attorney, Agent, or Firm* — Howard & Howard Attorneys PLLC

(57) ABSTRACT

A composition for dissolving and/or inhibiting deposition of scale on a surface of a system comprises an acidic component, a wetting agent, and a corrosion inhibitor. The composition may further comprise water. The acidic component comprises an alkanesulfonic acid, e.g. methanesulfonic acid (MSA). The wetting agent comprises a surfactant. The corrosion inhibitor comprises an amphoteric surfactant. The alkanesulfonic acid is present in an amount of at least about 50 weight percent (wt %), the surfactant is present in an amount of from about 0.1 to about 30 wt %, and the amphoteric surfactant is present in an amount of from about 0.025 to about 20 wt %, each based on 100 wt % of the alkanesulfonic acid, the surfactant, and the amphoteric surfactant combined. A method of dissolving and/or inhibiting deposition of scale on the surface of the system comprises the step of contacting the surface of the system with the composition.

20 Claims, 17 Drawing Sheets

US 8,648,026 B2

COMPOSITION COMPRISING AN ALKANESULFONIC ACID FOR DISSOLVING AND/OR INHIBITING DEPOSITION OF SCALE ON A SURFACE OF A SYSTEM

CROSS REFERENCE TO RELATED APPLICATIONS

This application claims the benefit of U.S. Provisional Patent Application Ser. No. 61/565,090, filed on Nov. 30, 2011, which is incorporated herewith by reference in its entirety.

FIELD OF THE INVENTION

The present invention generally relates to a composition for dissolving and/or inhibiting deposition of scale on a surface of a system, and more specifically to a composition comprising an acidic component, a wetting agent, and a corrosion inhibitor, and to a method of dissolving and/or inhibiting the deposition of scale on the surface of the system.

DESCRIPTION OF THE RELATED ART

Acid cleaning is a conventional process for removing inorganic scale deposits from cooling towers. If not removed, the scale will decrease the efficiency of the cooling tower, reflected in a lower ΔT, i.e., a lower difference in water temperature between hot and cool sides of the cooling tower. As cooling towers often contain metal parts (e.g. piping, heat exchangers, etc.), a compatible corrosion inhibitor is required during an acid cleaning process to prevent the metal surfaces from being damaged by the acid.

Scale buildup and the removal thereof can lead to increased operational costs and frequent system shutdowns. Additionally, scale deposits are rarely pure and often contain microorganisms and organic foulants that can cause additional operational problems. For example, sulfate-reducing bacteria contained in scale cause microbially-induced corrosion (or "under-deposit" corrosion) of the underlying metal surface. Extensive corrosion can lead to exorbitant repair costs and costs associated with system downtime (e.g. decreased productivity in a manufacturing process).

Hydrochloric acid (HCl) is commonly used in acid cleaning processes along with conventional HCl corrosion inhibitors. However, a concern with the use of HCl is safe handling due to the risk of exposure to harmful vapors. Specifically, both the mist and solution of HCl have a corrosive effect on human tissue, with the potential to damage respiratory organs, eyes, skin, and intestines. Other conventional acids utilized for system cleaning can pose similar risks.

In view of the foregoing, there remains an opportunity to provide improved compositions for removing scale from surfaces of systems. There also remains an opportunity to provide improved methods for removing scale from surfaces of systems.

SUMMARY OF THE INVENTION AND ADVANTAGES

The present invention provides a composition for dissolving and/or inhibiting deposition of scale on a surface of a system. The composition comprises an acidic component, a wetting agent, and a corrosion inhibitor. The acidic component comprises an alkanesulfonic acid. The wetting agent comprises a surfactant. The corrosion inhibitor comprises an amphoteric surfactant different from the surfactant of the wetting agent. The alkanesulfonic acid is present in an amount of at least about 50 weight percent (wt %). The surfactant of the wetting agent is present in an amount of from about 0.1 to about 30 wt %. The amphoteric surfactant of the corrosion inhibitor is present in an amount of from about 0.025 to about 20 wt %. Each of the weight percentages above are based on 100 wt % of the alkanesulfonic acid, the surfactant, and the amphoteric surfactant combined. The present invention also provides a method of dissolving and/or inhibiting deposition of scale on the surface of the system by contacting the composition and the surface of the system.

The composition has excellent scale removal properties and is ecologically friendly. The composition is also easier to handle and use relative to other conventional compositions, such as those utilizing hydrochloric acid (HCl). The method provides for excellent removal of the scale from the system by utilizing the composition.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
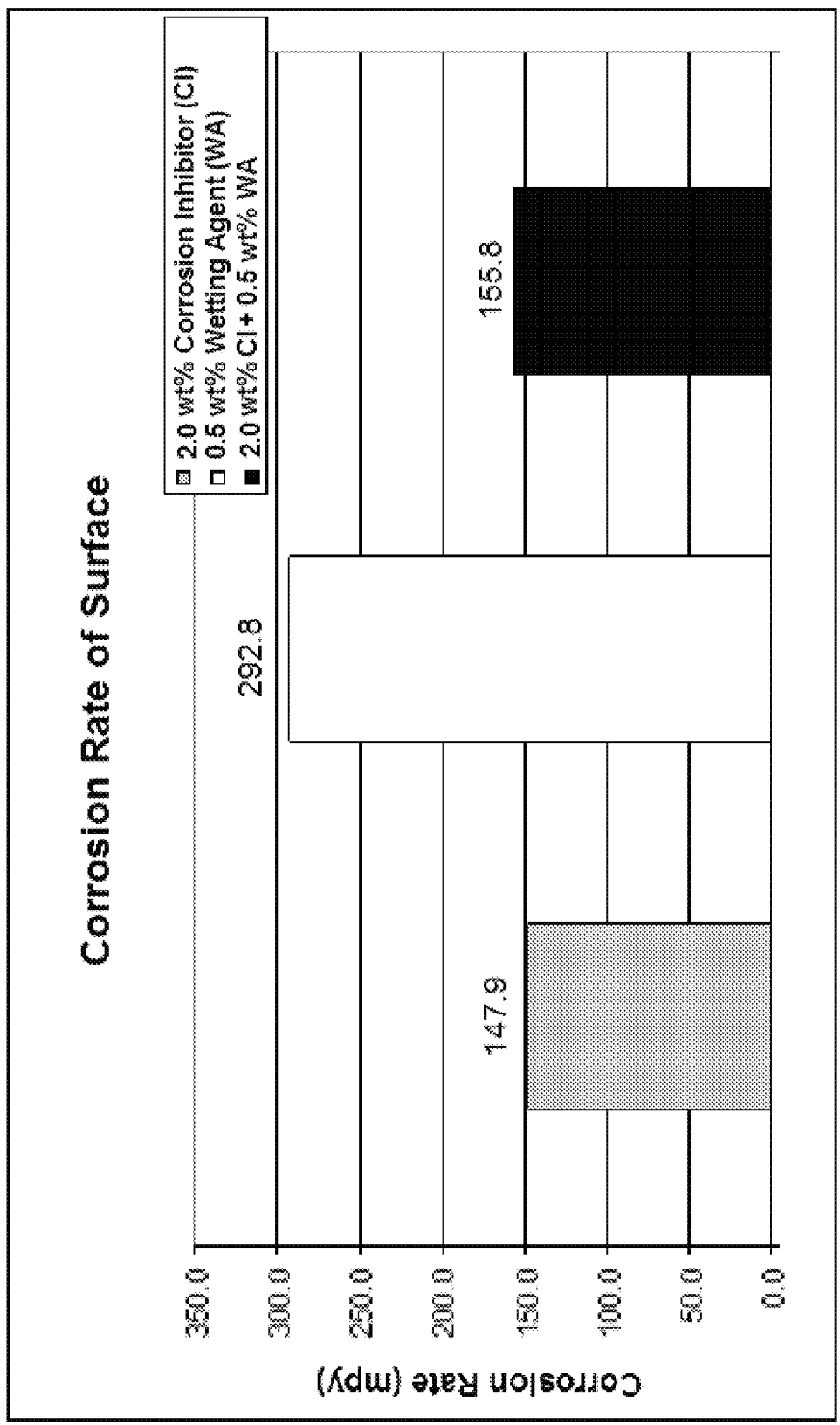
FIG. 1 is a bar graph illustrating corrosion amounts of various examples presented in the Examples section.

The present invention provides a composition for dissolving and/or inhibiting deposition of scale on a surface of a system. Typically, the composition is at least useful for dissolving scale on the surface of the system, and can also be useful for inhibiting the re-deposition of scale on the surface of the system, if such a problem arises. The scale may also be referred to in the art as foul/fouling. The composition is especially useful to replace conventional acid washing solutions, e.g. hydrochloric acid (HCl) washing solutions, as described further below.

The surface of the system is typically formed of a metal or an alloy thereof, such as iron, steel, aluminum, chromium, copper, etc., or an alloy/combination thereof. More specific examples of alloys include, but are not limited to, mild steel and galvanized steel. The composition is especially useful for such surfaces. The surface can be formed from other materials as well, such as a composite, a plastic, a ceramic, etc. For example, the surface may comprise a polymeric material, such as polyvinyl chloride (PVC). The surface may also comprise a combination of different materials, such as an alloy and a plastic.

The surface may be an inner or an outer surface of the system. Examples of inner surfaces include those found in pipelines, boilers, in chemical plants or the like. Examples of outer surfaces include those found on evaporators, conveyors, in manufacturing plants, in households, or the like.

Typically, the system is one in which the build up of scale is problematic. As such, the system can be of various types, such as being a heat transfer system, a filtration system, an evaporation system, etc. The composition has been found to be especially useful for heat transfer systems, such as cooling towers, shell and tube exchangers, plate heat exchangers, plate and shell heat exchangers, etc. Generally, any system where scale and corrosion concerns arise can be benefitted with use of the composition. Further examples of surfaces/systems include, but are not limited to, turbines, ship hulls, solar panels, reverse osmosis membranes, heating elements, reactors, petroleum reservoirs, water wells, geothermal wells, and oil wells. The system can be in an industrial, commercial, or residential setting. While specific examples of systems are described above, the composition can be used for a variety of systems and surfaces. Quite simply, the composition is not limited to any particular use. Further examples include systems and surfaces encountered in industrial and institutional (I & I) settings, such as with dairy and food processing equipment, as well as systems and surfaces encountered in other settings, such as hard surfaces, kitchen surfaces, bathroom surfaces, etc.

The scale can be made up of various components, depending on the type of surface/system. For example, a heat transfer system may include scale typically encountered with use of hard water, whereas an evaporation system may include scale stemming from concentrating the product of the evaporation system, e.g. phosphoric acid. Examples of scale include crystals or amorphous forms of solid salts, oxides, and hydroxides from water solutions (e.g. calcium carbonate and calcium sulfate), corrosion/rust, beerstone, milkstone, vegetable stone, phosphates, lime, silicates, etc. Typically, the composition is most useful for scales which are considered in the art to be basic. The composition has also been found to be especially useful for scale formed from use of hard water, such as calcium carbonate scale.

The composition comprises an acidic component, a wetting agent, and a corrosion inhibitor. In certain embodiments, the composition further comprises water.

The acidic component comprises an alkanesulfonic acid. As such, the acidic component may be the alkanesulfonic acid itself or may include one or more additional components, such as water. If the acidic component includes water, the alkanesulfonic acid can be provided in various concentrations. The acidic component is useful for dissolution of the scale.

The alkanesulfonic acid can be a short chain alkanesulfonic acid, such as one containing from 1 to 4 carbon atoms (e.g. one having propyl, ethyl, or methyl moieties). Typically, the alkanesulfonic acid is methanesulfonic acid (MSA). MSA is a strong organic acid that is believed to be completely non-oxidizing and thermally stable that forms highly soluble salts. The salt solubility of MSA makes the cleaning composition especially useful for replacing conventional acid cleaners. In addition, MSA has a low vapor pressure, has no odor, and is biodegradable. As such, the cleaning composition is easy to handle and use.

In certain embodiments, the composition is substantially free to completely free of phosphoric acid. In related embodiments, the composition is substantially free to completely free of hydrochloric acid. These embodiments are useful to minimize the amount of corrosion to the surface of the system, as well as providing improved ease of handling of the composition. Typically, the composition is completely free of both of these acids.

As alluded to above, in certain embodiments, the acidic component is aqueous. If the acidic component is aqueous, the alkanesulfonic acid, e.g. MSA, is typically present in an amount of from about 35 to about 95, or about 50 to about 85, or about 65 to about 85, or about 70, parts by weight, each based on 100 parts by weight of the acidic component. All ranges described herein, may vary outside of the explicit ranges, but are typically both whole and fractional values within such ranges.

Non-limiting examples of suitable acidic components are commercially available from BASF Corporation of Florham Park, N.J., under the trade name LUTROPUR®, such as LUTROPUR® MSA. In certain embodiments, the MSA is one which is formed by an air oxidation process, rather than from a chlorooxidation process. As such, the MSA has less metal content, such as less than 1 mg/kg, and little to no chloro compounds, which are generally corrosive. Other non-limiting examples of suitable acidic components are described in U.S. Pat. No. 6,531,629 to Eiermann et al. and in U.S. Pat. App. Pub. No. 2008/0161591 to Richards, the disclosures of which are incorporated herein by reference in their entirety to the extent they do not conflict with the general scope of the present invention described herein. The acidic component may include a combination of different alkanesulfonic acids.

The wetting agent comprises a surfactant. As such, the wetting agent may be the surfactant or may include one or more additional components, such as water. If the wetting agent includes water, the surfactant can be provided in various concentrations. The wetting agent is useful for aiding in dissolution of the scale. Specifically, it is believed that the wetting agent helps to counteract certain negative aspects of the corrosion inhibitor, as described further below.

In certain embodiments, the surfactant of the wetting agent is selected from the group of nonionic surfactants, amphoteric surfactants, or combinations thereof. In one embodiment, the wetting agent comprises a nonionic surfactant. In another embodiment, the wetting agent comprises an amphoteric surfactant. In another embodiment, the wetting agent comprises an anionic surfactant. In another embodiment, the wetting agent comprises a cationic surfactant. In other embodiments, the wetting agent comprises a combination of two or more of the aforementioned surfactants.

Non-limiting examples of suitable nonionic surfactants include polyalkylene oxide surfactants (also known as polyoxyalkylene surfactants or polyalkylene glycol surfactants). Suitable polyalkylene oxide surfactants include polyoxypropylene surfactants and polyoxyethylene glycol surfactants.

Suitable surfactants of this type are synthetic organic polyoxypropylene (PO)-polyoxyethylene (EO) block copolymers. These surfactants generally comprise a di-block polymer comprising an EO block and a PO block, a center block of polyoxypropylene units (PO), and having blocks of polyoxyethylene grafted onto the polyoxypropylene unit or a center block of EO with attached PO blocks. Further, this surfactant can have further blocks of either polyoxyethylene or polyoxypropylene in the molecules. The surfactant may also include butylene oxide (BO) blocks, and can include random incorporations of two or three alkylene oxides, e.g. EO/PO/BO, EO/PO/PO, EO/EO/PO, etc. Such surfactants may be referred to in the art as "heteric" block surfactants. Without being bound or limited by any particular theory, it is believed that the presence of a fatty tail in the surfactant of the wetting agent may be useful for descaling purposes. In certain embodiments, the nonionic surfactant has a fatty tail comprising of from 6 to 36, 8 to 22, 8 to 16, 10 to 14, or 12 to 14, carbon atoms. These fatty tails can imparted by building blocks of the surfactant, e.g. by fatty alcohols. As a specific example, lauryl myristyl alcohol can impart a C12-14 fatty tail to the nonionic surfactant.

Additional non-limiting examples of suitable nonionic surfactants include alcohol alkoxylates. Suitable alcohol alkoxylates include linear alcohol ethoxylates. Additional alcohol alkoxylates include alkylphenol ethoxylates, branched alcohol ethoxylates, secondary alcohol ethoxylates, castor oil ethoxylates, alkylamine ethoxylates (also known as alkoxylated alkyl amines), tallow amine ethoxylates, fatty acid ethoxylates, sorbital oleate ethoxylates, end-capped ethoxylates, or combinations thereof. Further nonionic surfactants include amides such as fatty alkanolamides, alkyldiethanolamides, coconut diethanolamide, lauramide diethanolamide, cocoamide diethanolamide, polyethylene glycol cocoamide, oleic diethanolamide, or combinations thereof. Yet further nonionic surfactants include polyalkoxylated aliphatic base, polyalkoxylated amide, glycol esters, glycerol esters, amine oxides, phosphate esters, alcohol phosphate, fatty triglycerides, fatty triglyceride esters, alkyl ether phosphate, alkyl esters, alkyl phenol ethoxylate phosphate esters, alkyl polysaccharides, block copolymers, alkyl polyglucocides, or combinations thereof. In one embodiment, the wetting agent comprises a nonionic surfactant blend including an alkoxylated alkyl amine.

Non-limiting examples of suitable wetting agents are commercially available from BASF Corporation, under the trade names of PLURAFAC®; PLURONIC®; TETRONIC®; LUTROPUR®; LUTENSOL®, such as LUTENSOL® A 65 N; EMULAN®, such as EMULAN® HE 50; and ARLYPON®, such as ARLYPON® VPC. Further non-limiting examples of suitable wetting agents are commercially available from Huntsman, under the trade names of EMPILAN®, such EMPILAN® KB and EMPILAN® KC; SURFONIC® L12; TERIC® 12A; and ECOTERIC®, such as ECOTERIC® B30 and ECOTERIC® B35. Further non-limiting examples of suitable wetting agents are commercially available from Croda, under the trade name of NatSurf™, such as NatSurf™ 265. Further non-limiting examples of suitable wetting agents are commercially available from Stepan, under the trade name of BIO-SOFT®, including the BIO-SOFT® N1, N23, and N91 series. Yet further non-limiting examples of suitable wetting agents are commercially available from Air Products, under the trade names of NONIDET® and TOMADOL®. It is to be appreciated that the wetting agent may include a combination of two or more different surfactants.

The corrosion inhibitor comprises an amphoteric surfactant. As such, the corrosion inhibitor may be the amphoteric surfactant or may include one or more additional components, such as water. If the corrosion inhibitor includes water, the amphoteric surfactant can be provided in various concentrations. The corrosion inhibitor is useful for inhibiting corrosion of the surface.

Non-limiting examples of suitable amphoteric surfactants include betaines, imidazolines, and propionates. Further examples of suitable amphoteric surfactants include sultaines, amphopropionates, amphrodipropionates, aminopropionates, aminodipropionates, amphoacetates, amphodiacetates, and amphohydroxypropylsulfonates. In certain embodiments, the amphoteric surfactant is at least one of a propionate or an amphodiacetate. Said another way, the corrosion inhibitor can comprise a propionate, an amphodiacetate, both a propionate and an amphodiacetate. Further specific examples of suitable amphoteric surfactants include N-acylamino acids, such as N-alkylaminoacetates and disodium cocoamphodiacetate; and amine oxides such, as stearamine oxide. In one embodiment, the amphoteric surfactant comprises disodium cocoamphodiacetate.

In certain embodiments, the amphoteric surfactant is illustrated by the formulas I) or II):

$$RCH_2NHCH_2CH_2COOM \qquad \text{I)}$$

$$RCH_2N(CH_2CH_2COOM)_2 \qquad \text{II)}$$

wherein M is a salt-forming cation (e.g. Na or H) and R is the hydrocarbon moiety of the long-chain fatty acid RCOOH, e.g. a $C_7$ to $C_{35}$, or a $C_7$ to $C_{18}$, fatty acid. Such amphoteric surfactants include sodium N-coco-β-aminopropionate, N-coco-β amino propionic acid; N-lauryl, myristyl-β-amino propionic acid; disodium N-tallow-β-iminopropionate; disodium N-lauryl-β-iminopropionate (also known as sodium lauriminodipropionate); and the partial sodium salt of N-lauryl-β-iminopropionic acid. In one embodiment, the amphoteric surfactant comprises sodium lauriminodipropionate.

As alluded to above, in certain embodiments, the corrosion inhibitor is aqueous. If the corrosion inhibitor is aqueous, the amphoteric surfactant is typically present in an amount of from about 15 to about 95, about 20 to about 80, about 25 to about 60, or about 30 to about 50, parts by weight, each based on 100 parts by weight of the corrosion inhibitor.

Non-limiting examples of suitable corrosion inhibitors are commercially available from BASF Corporation, under the trade names of DERIPHAT®, such as DERIPHAT® 151, DERIPHAT® 151C, DERIPHAT® 154, DERIPHAT® 160C, and DERIPHAT® 170C; MAFO®, such as MAFO® 13 MOD 1; and DEHYTON®, such as DEHYTON® DC. Further suitable examples are commercially available from Henkel Corporation of Madison Heights, Mich., under the trade name RODINE®, such as RODINE® 213-SF. The corrosion inhibitor may include a combination of two or more different amphoteric surfactants.

The alkanesulfonic acid is typically present in an amount of at least about 50, or from about 50 to about 99, about 65 to about 95, or about 75 to about 95, weight percent (wt %). The surfactant is typically present in an amount of from about 0.1 to about 30, about 1 to about 25, about 5 to about 20, or about 7.5 to about 15, wt %. The amphoteric surfactant is typically present in an amount of from about 0.025 to about 20, or about 0.05 to about 17.5, about 0.1 to about 15, about 0.1 to about 10, about 0.25 to about 5, or about 0.5 to about 2.5, wt %. Each of these weight percentages for the components is based on 100 wt % of the alkanesulfonic acid, the surfactant, and the amphoteric surfactant combined (collectively referred to hereinafter as "the three components"). As such, the cleaning composition can comprise a concentrate of the three components in their respective weight ratios, or a dilution of the three components, such as an aqueous dilution of the three components in their respective weight ratios. The weight percentages may also be referred to in the art as percent actives of the three components.

In certain embodiments, the composition further comprises water such that the three components are diluted, i.e., such that the composition is aqueous. The water can be of various types. In certain embodiments, the water is de-mineralized and/or de-ionized. The water is present in the composition in various amounts, depending on the embodiment. The water can be added to the composition as a separate component. However, it is to be appreciated that some of the water can also be imparted by one or more of the three components, such as by the acidic component, when aqueous.

In certain embodiments, water is present in the composition in an amount of at least about 75, at least about 80, at least about 85, at least about 90, at least about 92.5, or at least about 95, parts by weight, each based on 100 parts by weight of the (aqueous) composition. In certain embodiments, the water is present in the remaining amount of parts by weight of the composition including the three components. In further embodiments, the composition is substantially free to completely free of other conventional components, such as defoamers. The composition generally has excellent dissolution and/or inhibition properties without requiring supplemental components. For example, the three components may collectively be present in an amount of from about 1 to about 25, about 1 to about 20, about 1 to about 15, about 1 to about 10, about 1 to about 7.5, or about 1 to about 5, parts by weight, each based on 100 parts by weight of the composition, remainder water. As alluded to above, the parts by weight may also be referred to in the art as total percent actives of the composition. In further embodiments, the composition consists essentially of the three components, with or without water. In yet further embodiments, the composition consists of the three components, with or without water.

Typically, the composition is substantially free of phosphorus-containing compounds, making the composition more environmentally acceptable. Phosphorus-free refers to a composition, mixture, or ingredients to which phosphorus-containing compounds are not added. Should phosphorus-containing compounds be present through contamination of a phosphorus-free composition, mixture, or ingredient, the level of phosphorus-containing compounds in the resulting composition is typically less than about 0.5, less than about 0.1, or less than about 0.01, wt %.

The composition typically has a pH of from about 0 to about 3, about 0 to about 2, about 0 to about 1, about 0.1 to about 1, about 0.25 to about 0.75, or about 0.5 to about 0.6. The pH of the composition is generally imparted by the type and amount of components employed to form the composition. For example, if the composition is diluted with water, the pH will generally increase.

As introduced above, the acidic component is useful for dissolving the scale from the surface of the system. At the same time, the corrosion inhibitor is useful for protecting the (underlying or exposed) surface from corrosion. It is believed that this corrosion protection is achieved via a film forming mechanism on the surface. Specifically, it is believed that the corrosion inhibitor has an affinity for the surface, especially when formed of metal. However, it is also believed that this film forming mechanism impedes the ability of the acidic component from properly interacting with the scale, since the film not only forms on the surface, but also forms on (or near) the scale itself. As such, it is believed that the corrosion inhibitor at least partially passivates the scale from being dissolved by the acidic component, which reduces the effectiveness of the acidic component from doing its intended function. For example, it has been observed that the effectiveness of the acidic component can be reduced by upwards of 50% when the corrosion inhibitor is present. Without being bound or limited by any particular theory, it is believed that the wetting agent restores scale dissolving capability of the MSA in the presence of the corrosion inhibitor, while effectiveness of the film-forming corrosion inhibitor on metal surfaces is not disrupted by the presence of the surfactant.

Surprisingly, it was discovered that the wetting agent counteracts the deleterious effect of the corrosion inhibitor on the scale dissolution. Without being bound or limited by any particular theory, it is believed that the wetting agent disrupts the film formed on the scale (or prevents its initial formation), thus allowing the acidic component to dissolve the scale but leaves the film on the surface intact thus preventing the surface from corroding. Said another way, the composition provides a unique combination of the three components that not only provides for excellent corrosion inhibition, but also excellent and efficient scale removal by preventing the aforementioned passivation by the corrosion inhibitor. As such, it has been found that the composition provides excellent corrosion protection for a variety of surfaces, such as mild steel, galvanized steel, copper, and aluminum. In addition, the composition provides for excellent dissolution of various types of scale, such as calcium carbonate scale. The present invention also provides a method of dissolving and/or inhibiting deposition of the scale on the surface of the system. The method comprises the step of bringing the surface of the system into contact with a composition. The composition is as described and exemplified above.

The composition can be brought into contact with the surface by various methods, such as by applying the composition to the surface, e.g. by dipping the surface in the composition, spraying the composition on the surface, rolling the composition on the surface, etc. Various application apparatuses understood in the art can be employed, such as a spraying apparatus, a dip tank, etc. It is efficient to apply the composition to the surface such that it is directed primarily toward the scale rather than on surface that lacks scale. The composition can also be flowed onto and/or past the surface, such as in a pipeline.

Typically, the surface does not need to be pretreated, such as being mechanically cleaned by scrapping, scrubbing, etc., prior to bringing the composition into contact with the surface. However, such pretreatment steps may be employed to expedite removal of the scale from the surface of the system. If the surface is an internal surface, such as those found in pipelines, the scale can be removed by filling the system with the composition (i.e., soaking), and optionally, circulating the composition in the system, e.g. by pumping. The surface can also be prewashed, such as with water, in order to remove other residues prior to bringing the composition into contact with the scale/surface.

The method may further comprise the step of applying heat to the composition and/or the system. The step may be useful for expediting dissolution of the scale from the surface of the system. However, it is to be appreciated that the composition may also be brought into contact with the scale at room or ambient temperature. Generally, increasing temperature of the composition, either directly or indirectly, will accelerate the rate at which the scale is dissolved by the composition once contacted. Heating can be accomplished by various means understood in the art. For example, the composition can be heated in the system by heating means already present in the system. Optionally, a separate heat exchanger can be used to heat the composition.

Typically, the composition should be allowed to contact the scale for a least a period of time. For example, the composition can be kept in contact for a period of time of from about 5 to about 450, about 5 to about 150, about 15 to about 120, about 45 to about 90, or about 60, minutes.

Generally, at least a portion, if not all, of the scale is removed from surface of the system. Typically, the longer the composition is in contact with the surface, the greater the amount of scale removed from the surface. Removal can be increased via agitation of the composition when in contact with the surface, such that the composition also physically removes the scale (e.g. by shear) in addition to chemically removing the scale. Agitation can be accomplished via the circulation as described above or by other means understood in the art.

In specific embodiments, the composition comprises MSA and disodium cocodiamphodiacetate, and in further embodiments, consists essentially of MSA, disodium cocodiamphodiacetate, and water. In other specific embodiments, the composition comprises MSA and a nonionic surfactant blend including an alkoxylated alkyl amine, and in further embodiments, consists essentially of MSA, the nonionic surfactant blend including an alkoxylated alkyl amine, and water. In other specific embodiments, the composition comprises MSA and an alkoxylated alkyl amine, and in further embodiments, consists essentially of MSA, the alkoxylated alkyl amine, and water. In other specific embodiments, the composition comprises MSA and a linear alcohol ethoxylate, and in further embodiments, consists essentially of MSA, the linear alcohol ethoxylate, and water. In other specific embodiments, the composition comprises MSA and sodium lauriminodipropionate, and in further embodiments, consists essentially of MSA, sodium lauriminodipropionate, and water. In other specific embodiments, the composition comprises MSA, sodium lauriminodipropionate, and disodium cocodiamphodiacetate, and in further embodiments, consists essentially of MSA, sodium lauriminodipropionate, disodium cocodiamphodiacetate, and water. In yet other embodiments, various combinations of two, three, or more of the aforementioned components can be employed.

The following examples, illustrating the composition and method of the present invention, are intended to illustrate and not to limit the invention.

EXAMPLES

Corrosion rates of various components are evaluated. Specifically, coupons comprising galvanized steel are evaluated in various compositions. The compositions are made by providing an acidic component (AC). The AC comprises 70 wt % methanesulfonic acid (MSA), remainder water. The AC is commercially available from BASF Corporation.

Next, a corrosion inhibitor (CI) is added to the acidic component in various amounts (e.g. 1 wt % to 8 wt %) to form mixtures. The mixtures are then diluted with deionized (DI) water to form dilutions, such that the CI is present in an amount of from about 0.025 to about 0.4 wt %. The CI comprises 30 wt % sodium lauriminodipropionate, remainder water. The CI is commercially available from BASF Corporation.

Next, if employed, the wetting agent (WA) is added in various amounts (e.g. 0.5 wt %) to the dilutions to form compositions. The WA is a nonionic surfactant blend including an alkoxylated alkyl amine. The WA is commercially available from BASF Corporation.

The coupons are weighed to determine a starting weight. The coupons are then placed in the compositions or dilutions for one hour. The compositions or dilutions are at about 24° C. The coupons are visually observed for corrosion over the passage of time. The coupons are removed, dried, and reweighed to determine loss in weight due to corrosion.

A first comparative dilution comprises the AC, and the coupon therein turns black due to corrosion and formation of a passivating layer (e.g. iron oxide). A second comparative dilution comprises the AC and CI, and the coupon therein maintains a good luster with some slight effervescence indicating minor corrosion. A third comparative dilution comprises the AC and WA, and the coupon therein has extensive corrosion indicated by heavy effervescence. An inventive composition comprises the AC, CI, and WA, and the coupon therein maintains an excellent luster with no effervescence indicating no corrosion. As such, it is observed that the combination of the AC, CI, and WA provides excellent corrosion results for galvanized steel. These corrosion results for galvanized steel are better than using just the AC and CI alone. As such, it is believed that a synergy exists in the inventive composition.

Similar tests are repeated using coupons comprising mild steel. Referring to FIG. 1, it is shown that the combination of the AC, CI, and WA has comparable results to using the AC and CI alone. In addition, the presence of the WA does not interfere with the function of the CI. The AC, CI, and WA are the same as those described above. The pH of the inventive composition (i.e., AC, CI, and WA, remainder water), is from about 0.5 to 0.6. The corrosion rate is illustrated in mils per year (mpy), based on weight lose of the coupon after the passage of one hour.

Referring to FIGS. 2 through 6, scale dissolution rates of various comparative dilutions and inventive compositions are evaluated. First, small Carrara marble tiles (ca. 3 cm×1.5 cm×0.8 cm; length×width×depth) are removed from a glued mesh backing by soaking the tiles in a 1 wt % solution of a surfactant in water overnight, wiping off the remaining glue residue, rinsing several times with water, followed by DI water, wiping the tiles using ethanol and a cloth or paper towel and drying in an oven at 105° C. for at least one hour. The tiles are weighed to determine a starting weight. The tiles comprise calcium carbonate and represent scale. Each of the comparative dilutions and inventive compositions are evaluated in triplicate. As such, average weight losses are illustrated in the Figures to indicate scale dissolution capabilities of the comparative and inventive examples (also referred to as solutions).

For the inventive examples, it is found best to first dissolve the wetting agent in the acidic component and the corrosion inhibitor followed by addition of DI water. The solutions are shaken well to completely mix the components thereof. Depending on the components used, analytical and/or top loading balances can be used to measure out amounts for each.

A stock solution of each example is made, and the stock solution is split and added into 2 ounce glass jars in triplicate. A pre-weighed tile is carefully introduced into each jar using tweezers. The room/ambient temperature ranges from about 22 to about 25° C., and is detailed below. The tiles are in contact with the solutions for about 15 minutes. The solutions are then disposed of, and the tiles are removed from the jars and thoroughly rinsed with tap water and triple rinsed with DI water to ensure removal of all of the solution. The tiles are then dried for about one hour at about 105° C., allowed to cool completely, and re-weighed to determine the weight loss of the tile due to the respective solution.

Each of the solutions, and the results thereof, are described in greater detail below. As used hereafter, a dilution generally refers to a solution having the AC and either the WA or the CI, but not both. A composition generally refers to a solution having all three components, i.e., all three of the AC, WA, and CI.

Figure 2:
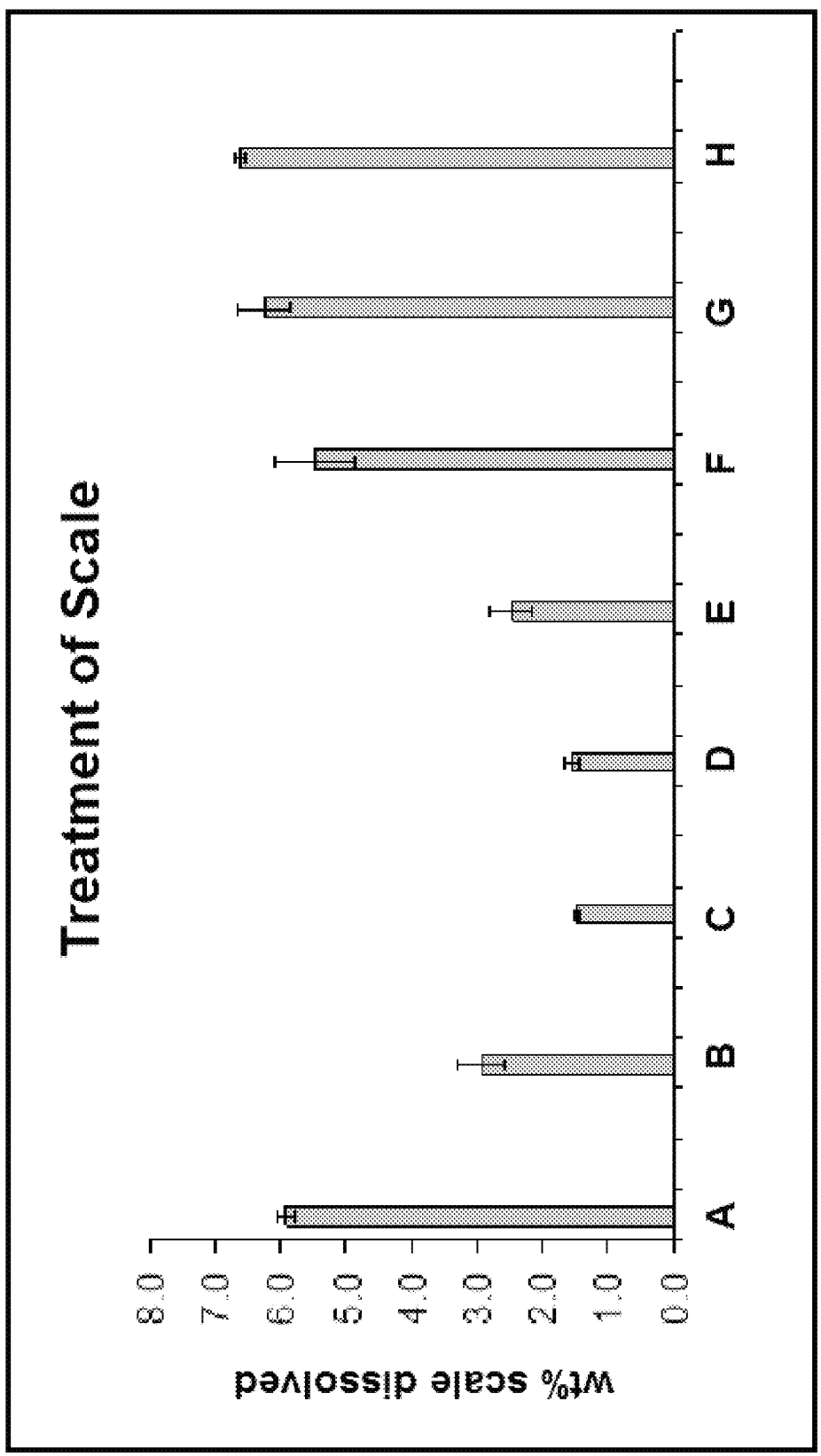
FIG. 2 is a bar graph illustrating dissolution of scale amounts of various examples.

In FIG. 2, comparative dilution A is the AC alone diluted with DI water to 3.27 wt % actives (MSA) (or a 34.0 mmol MSA/100 g dilution). Comparative dilution B is the same as dilution A but also has 0.0286 wt % actives of the CI (sodium lauriminodipropionate). Inventive composition C is the same as dilution B but also has 0.025 wt % actives of the WA (a nonionic surfactant blend including an alkoxylated alkyl amine). Inventive composition D is the same as composition C but with 0.05 wt % actives of the WA. Inventive composition E is the same as composition D but with 0.1 wt % actives of the WA. Inventive composition F is the same as composition E but with 0.2 wt % actives of the WA. Inventive composition G is the same as composition F but with 0.35 wt % actives of the WA. Inventive composition H is the same as composition G but with 0.5 wt % actives of the WA. These solutions are all evaluated at 24° C.

As shown with dilution B, the inclusion of the CI causes the AC to be less effective in dissolving the scale. With compositions C through H, it is shown that increasing the amount of WA generally increases the de-scaling capability, with compositions G and H matching and even exceeding the de-scaling capability of the AC alone, i.e., dilution A. In addition, compositions G and H have excellent corrosion results relative to dilution A based on the presence of the CI in each.

Figure 3:
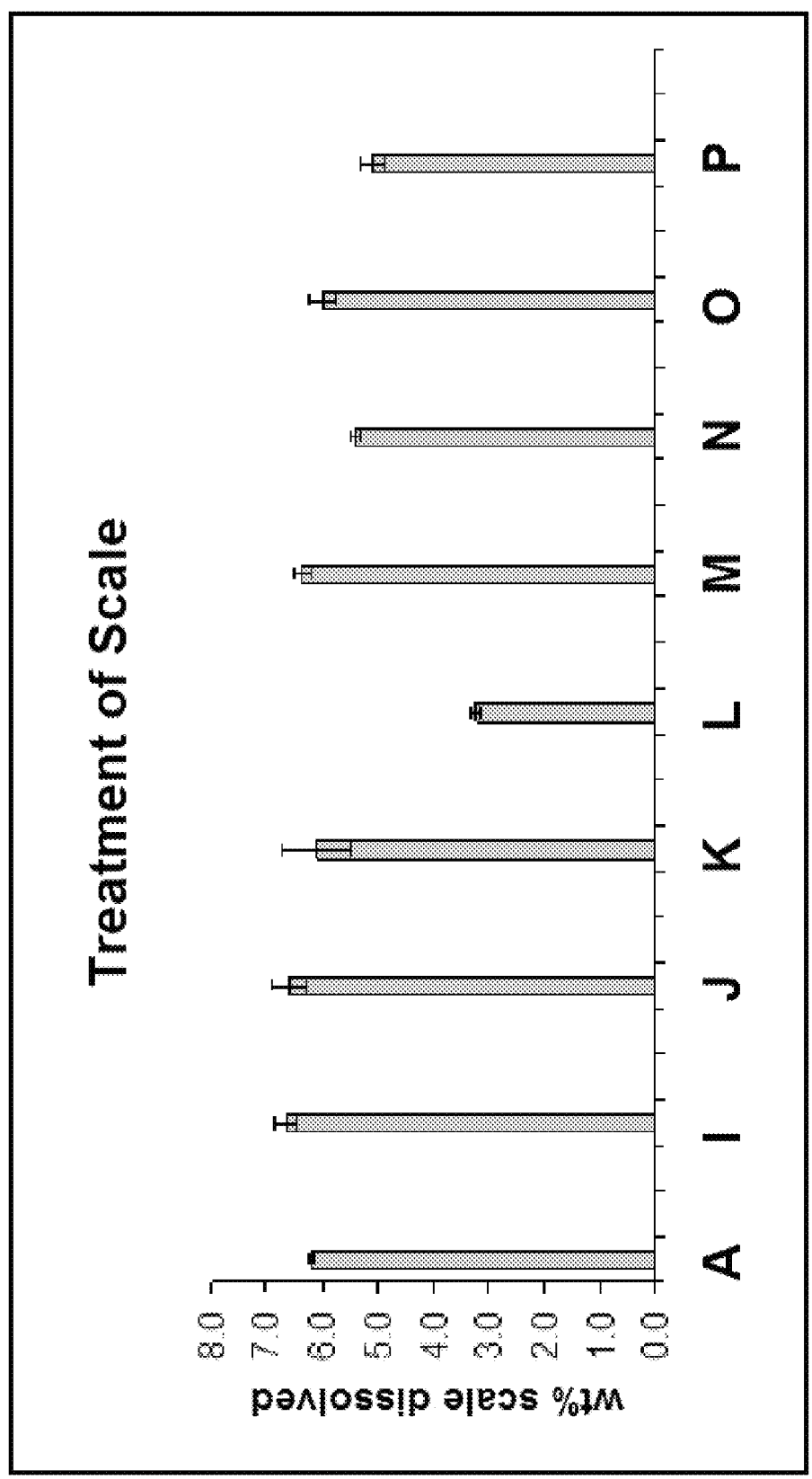
FIG. 3 is another bar graph illustrating dissolution of scale amounts of various examples.

In FIG. 3, comparative dilution A is the same as above. Comparative dilution I is the same as dilution A but also has 0.2 wt % actives of a second wetting agent (WA2). The WA2 is a tetrafunctional block copolymer surfactant, terminating in primary hydroxyl groups, and is 100% active. The WA2 is commercially available from BASF Corporation. Comparative dilution J is the same as dilution I but with 0.5 wt % actives of the WA2. Comparative dilution K is the same as dilution J but with 1.0 wt % actives of the WA2. Inventive composition L is the same as dilution J but also has 0.0286 wt % actives of the CI. Comparative dilution M is the same as dilution A but also with 1 wt % actives of the WA. Comparative dilution N is the same as dilution M but with 3.0 wt % actives of the WA. Inventive composition O is the same as dilution L but also with 1.0 wt % actives of the WA. Inventive composition P is the same as composition O but with 3.0 wt % actives of the WA. These solutions are all evaluated at 24° C.

As shown with composition O relative to composition L, it is discovered that the inclusion of the WA greatly increases the de-scaling capability of the solution. As shown in the Figures, it is appreciated that the inclusion of the CI generally causes the AC to be less effective in dissolving the scale. With compositions C through H, it is shown that increasing the amount of WA generally increases the de-scaling capability, with compositions G and H matching and even exceeding the de-scaling capability of the AC alone, i.e., dilution A. In addition, compositions G and H would have excellent corrosion results relative to dilution A based on the presence of the CI in each.

Figure 4:
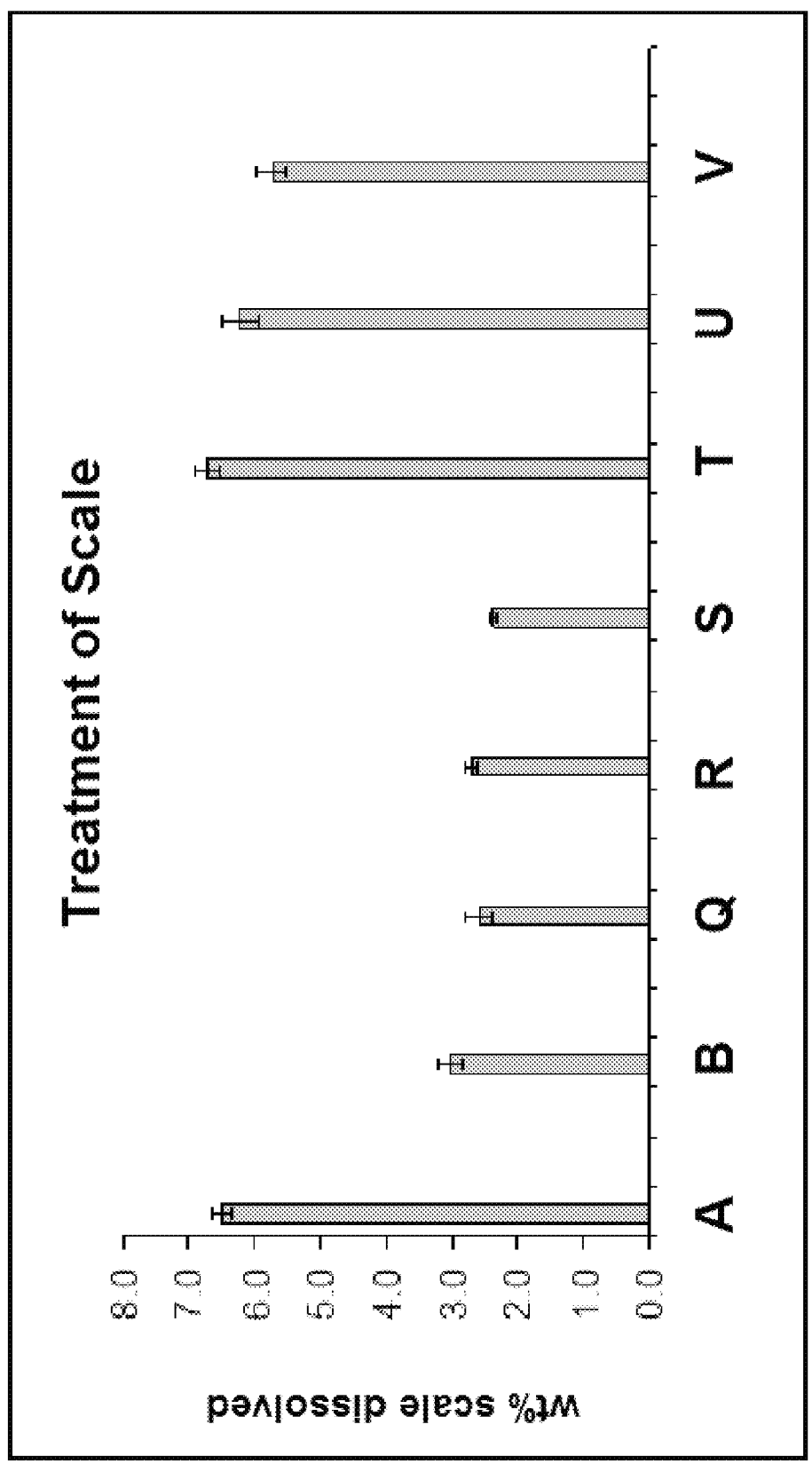
FIG. 4 is another bar graph illustrating dissolution of scale amounts of various examples.

In FIG. 4, comparative dilutions A and B are the same as above. Comparative dilution Q is the same as L above. Comparative dilution R is the same as dilution Q but with 1.0 wt % actives of the WA2. Comparative dilution S is the same as dilution R but with 2.0 wt % actives of the WA2. Inventive composition T is the same as composition H above. Inventive composition U is the same as composition T but with 1.0 wt % of the WA. Inventive composition V is the same as composition U but with 2.0 wt % of the WA. These solutions are all evaluated at 25° C.

As shown, WA generally works better than WA2 in combination with the AC and CI. In addition, once a certain amount of WA is reached, there are diminishing returns on de-scaling capability of the compositions. Without being bound or limited by any particular theory, it is believed that when high levels of alkoxylated alkyl amine are present, a significant amount of MSA is deprotonated, and thus unavailable to descale the surface.

Figure 5:
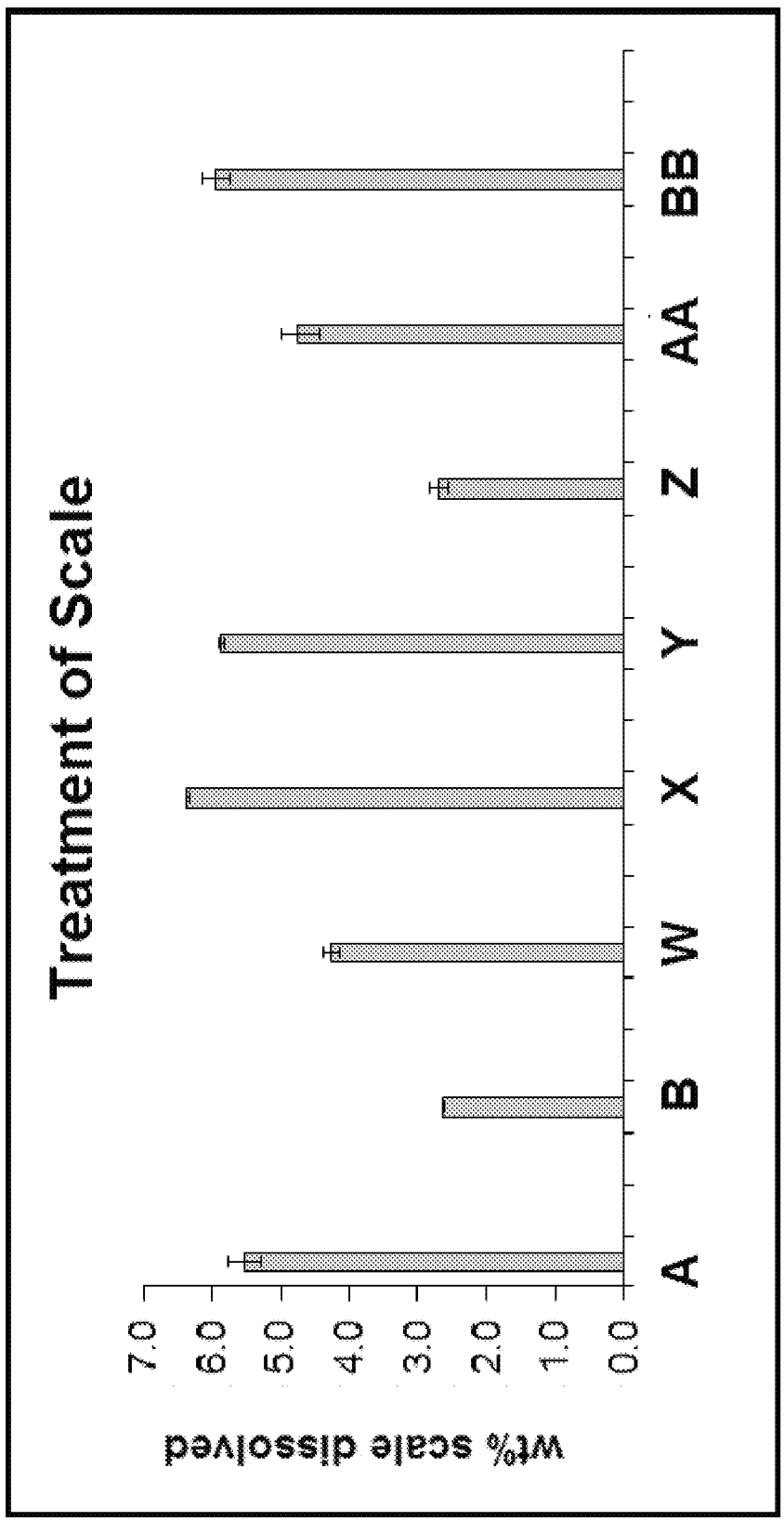
FIG. 5 is another bar graph illustrating dissolution of scale amounts of various examples.

In FIG. 5, comparative dilutions A and B are the same as above. Inventive composition W is the same as dilution B but also has 0.5 wt % actives of a third wetting agent (WA3). The WA3 is a 100% active nonionic surfactant composed of a three mole ethylene oxide adduct of a linear C12-14 alcohol. The WA3 is commercially available from BASF Corporation. Inventive composition X is the same as dilution B but also has 0.5 wt % actives of a fourth wetting agent (WA4). The WA4 is a 100% active nonionic surfactant composed of a seven mole ethylene oxide adduct of a linear lauryl myristyl alcohol. WA4 has a C12-14 fatty tail. The WA4 is commercially available from BASF Corporation. Inventive composition Y is the same as dilution B but also has 0.5 wt % actives of a fifth wetting agent (WA5). The WA5 is a 100% active nonionic surfactant composed of a six mole ethylene oxide adduct of a tridecyl alcohol. The WA5 is commercially available from BASF Corporation. Comparative composition Z is the same as dilution B but also has 0.5 wt % actives of a sixth wetting agent (WA6). The WA6 is a 100% active anionic surfactant. The WA6 is commercially available from BASF Corporation. Inventive composition AA is the same as dilution B but also has 0.5 wt % actives of a seventh wetting agent (WA7). The WA7 is a potassium salt of a complex amine carboxylate and is considered to be an amphoteric surfactant. The WA7 is commercially available from BASF Corporation. Inventive composition BB is the same as composition T. These solutions are all evaluated at 22° C.

As shown, different wetting agents have different impacts on the de-scaling capabilities of the solutions. Compositions X, AA, and BB generally meet or even exceed the de-scaling capability of the AC alone, i.e., dilution A. In addition, compositions X and BB have excellent corrosion results relative to dilution A based on the presence of the CI in each.

Figure 6:
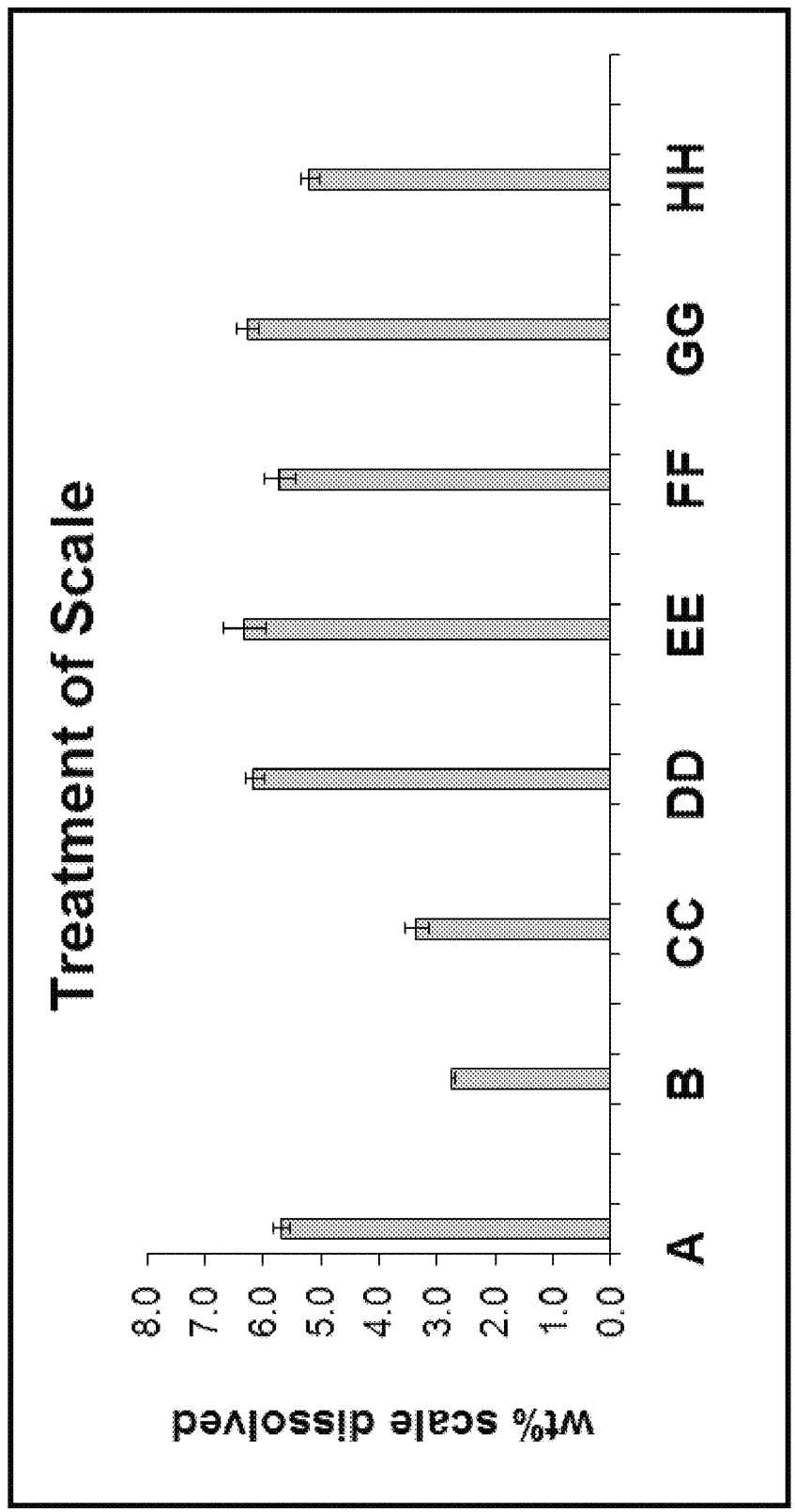
FIG. 6 is another bar graph illustrating dissolution of scale amounts of various examples.

In FIG. 6, comparative dilutions A and B are the same as above. Comparative dilution CC is the same as dilution A but also has 0.465 wt % actives of a second corrosion inhibitor (CI2). The CI2 comprises 46.5 wt % disodium cocodiamphodiacetate, remainder water. The CI2 is commercially available from BASF Corporation. Comparative dilution DD is the same as dilution A but also has 1.0 wt % of a third corrosion inhibitor (CI3). The CI3 comprises a proprietary blend of 2-butoxyethanol, polyethylene glycol monooleyl ether, corrosion inhibitor, acetophenone, and propargyl alcohol. The CI3 is commercially available from Henkel.

Inventive composition EE is the same composition X above. Inventive composition FF is the same as dilution A but also has 0.5 wt % actives of WA4 and 0.0465 wt % actives of CI2. Inventive composition GG is the same as dilution A but also has 0.5 wt % actives of WA4 and 1.0 wt % of CI3. Inventive composition HH is the same as composition EE but with 0.125 wt % actives of the WA4. These solutions are all evaluated at 22° C.

As shown, different wetting agents have different impacts on the de-scaling capabilities of the solutions. Compositions EE, FF, GG, and HH generally meet or even exceed the de-scaling capability of the AC alone, i.e., dilution A. In addition, compositions EE, FF, GG, and HH have excellent corrosion results relative to dilution A based on the presence of the CI in each.

Figure 7:
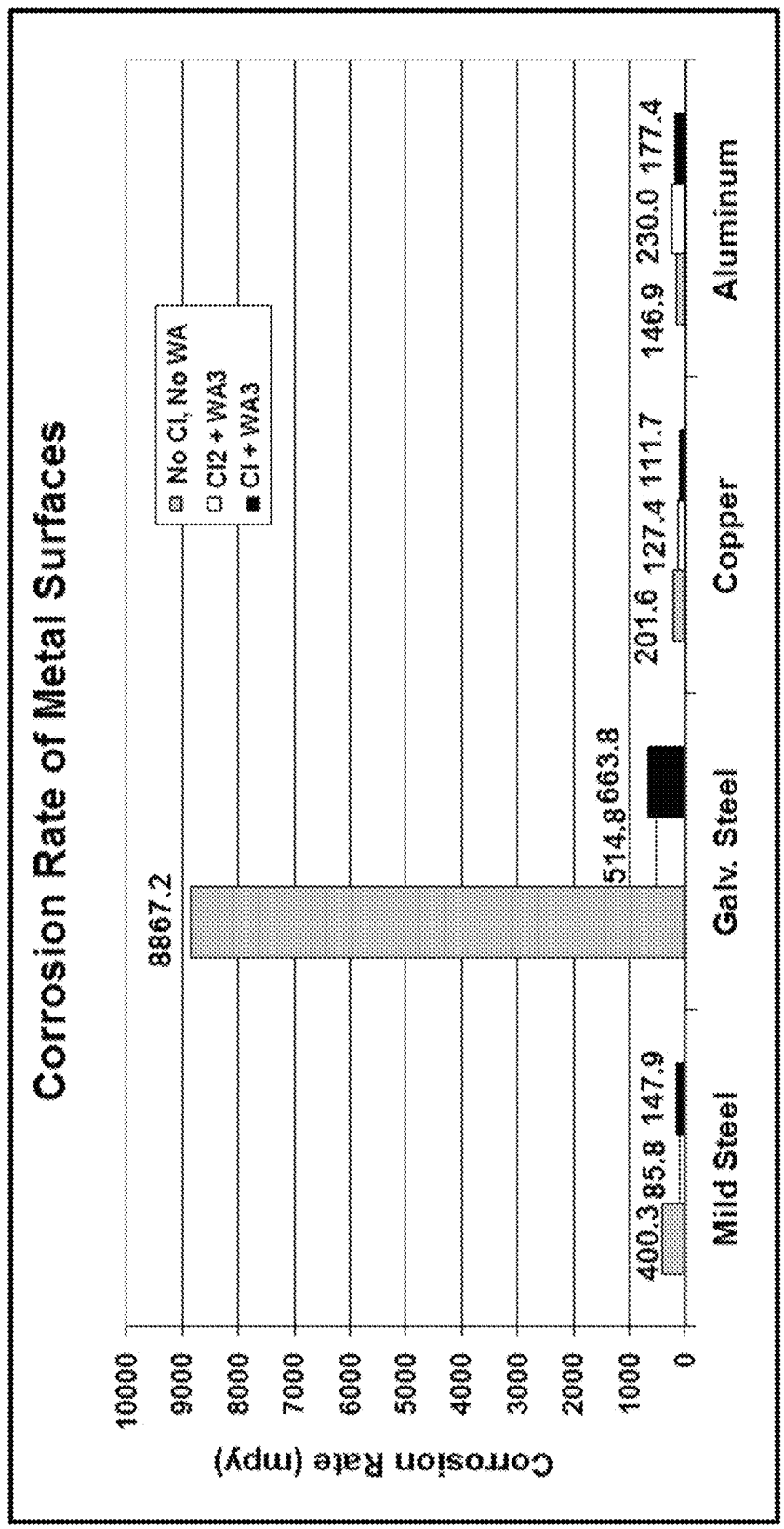
FIG. 7 is a bar graph illustrating corrosion amounts of various examples.
Figure 8:
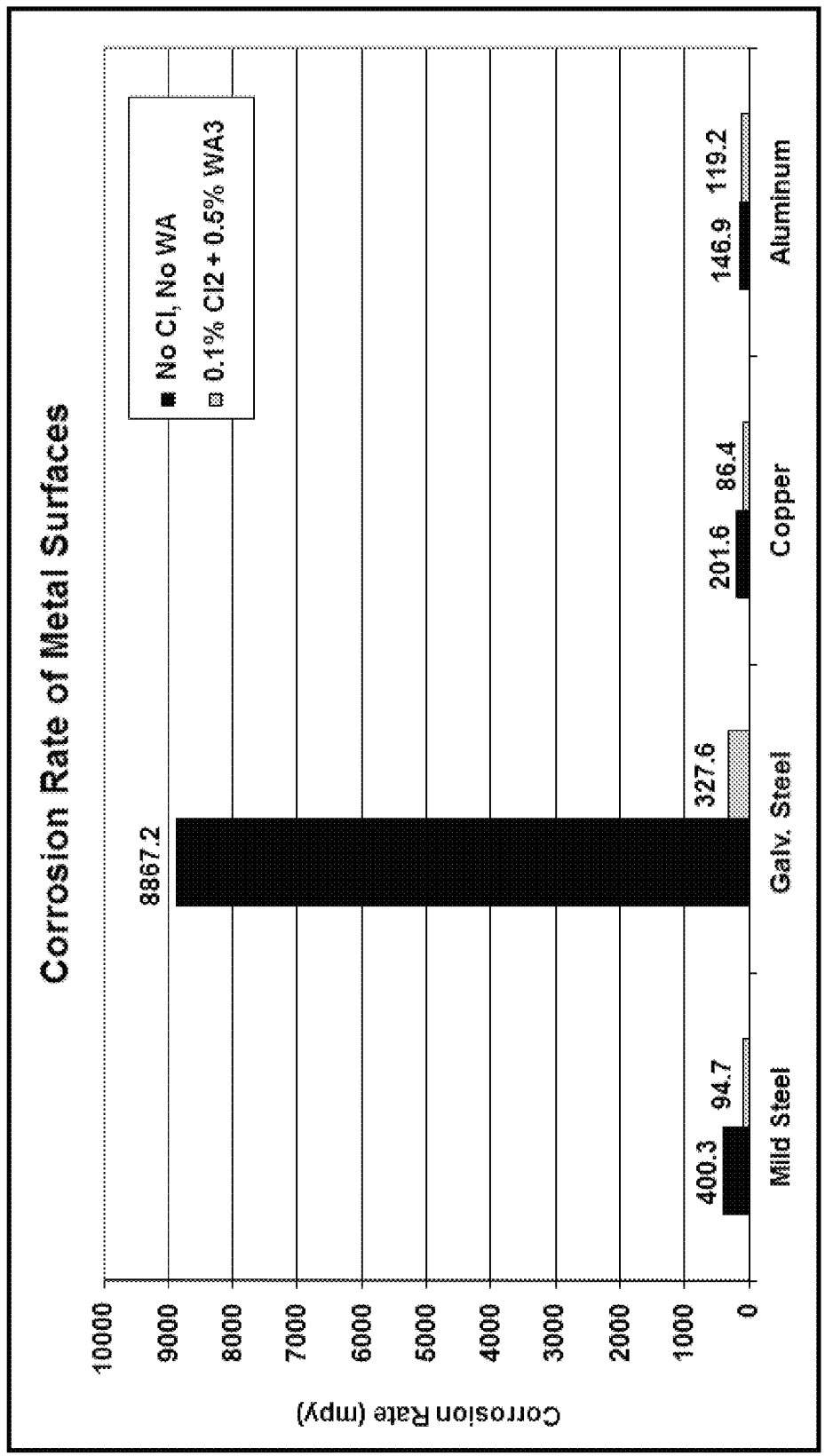
FIG. 8 is another bar graph illustrating corrosion amounts of various examples.
Figure 9:
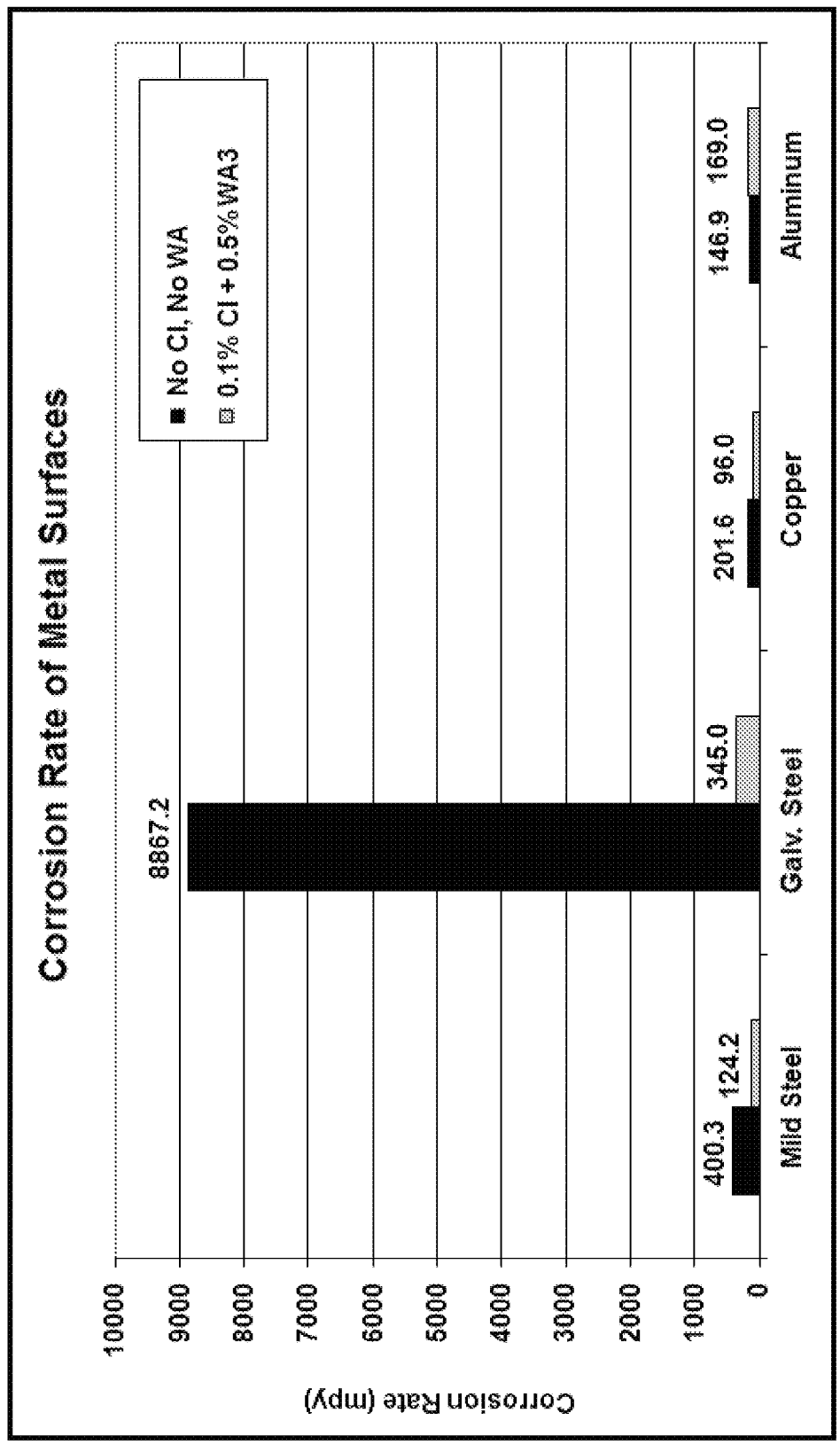
FIG. 9 is another bar graph illustrating corrosion amounts of various examples.
Figure 10:
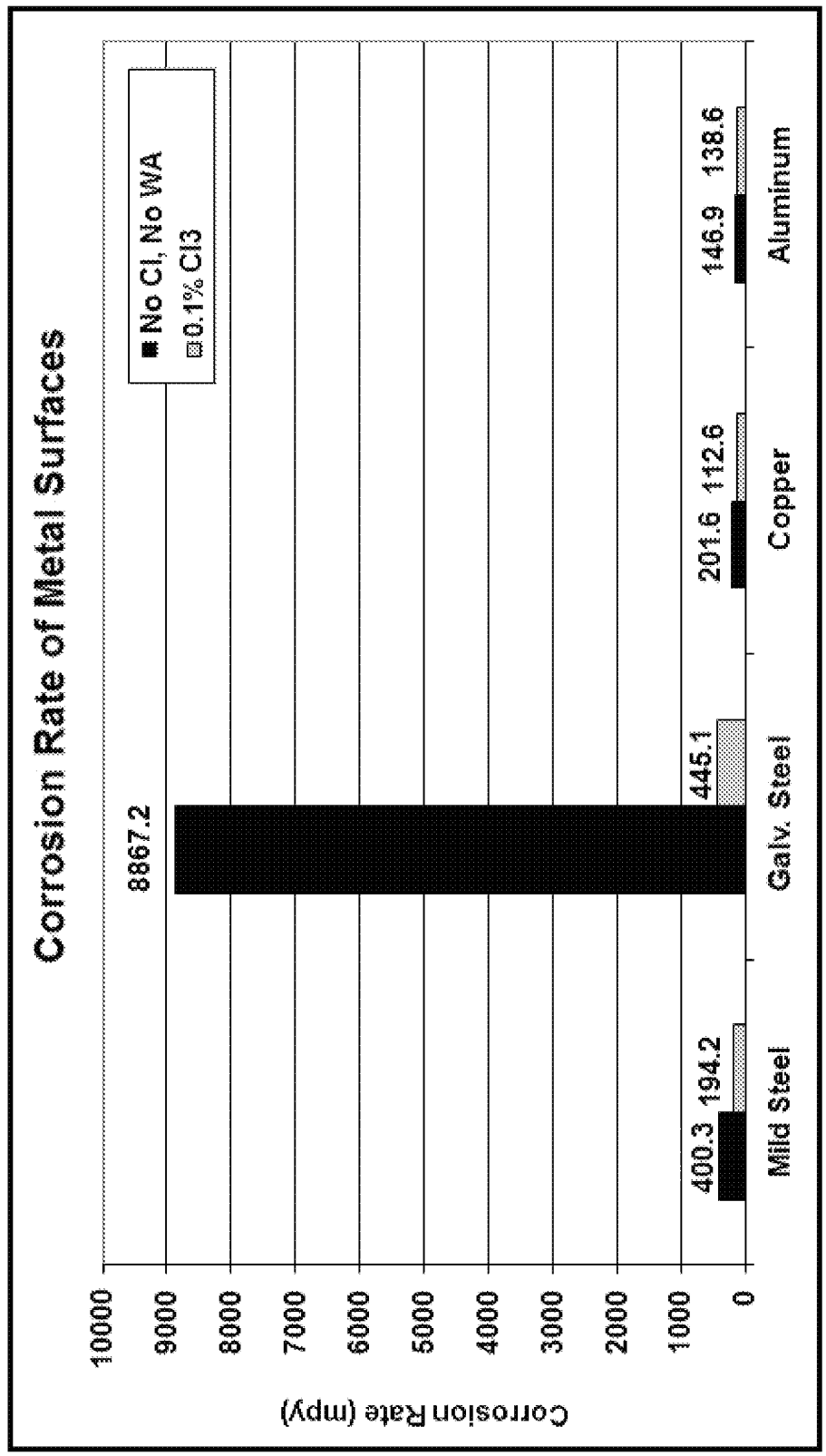
FIG. 10 is another bar graph illustrating corrosion amounts of various examples.
Figure 11:
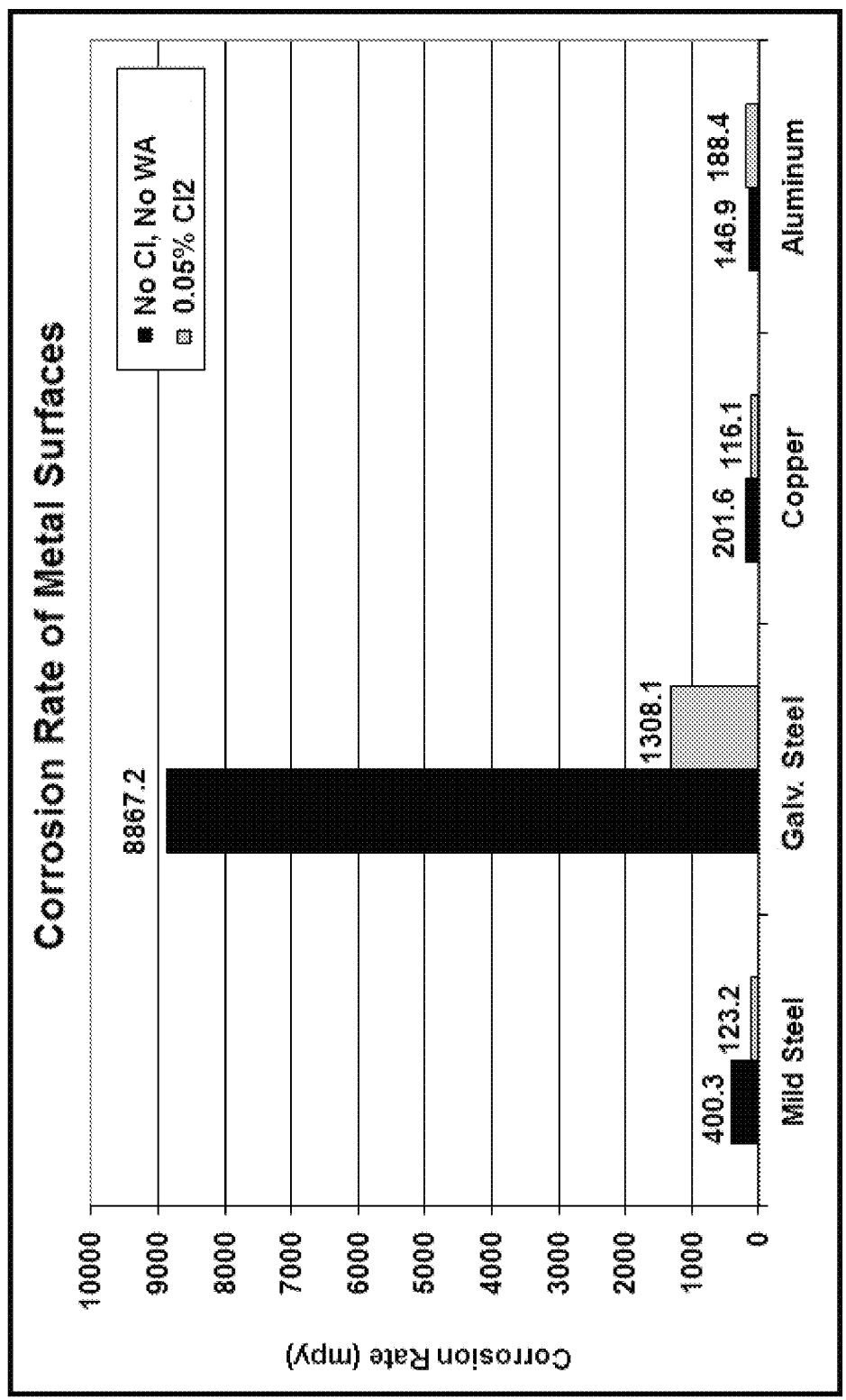
FIG. 11 is another bar graph illustrating corrosion amounts of various examples.
Figure 12:
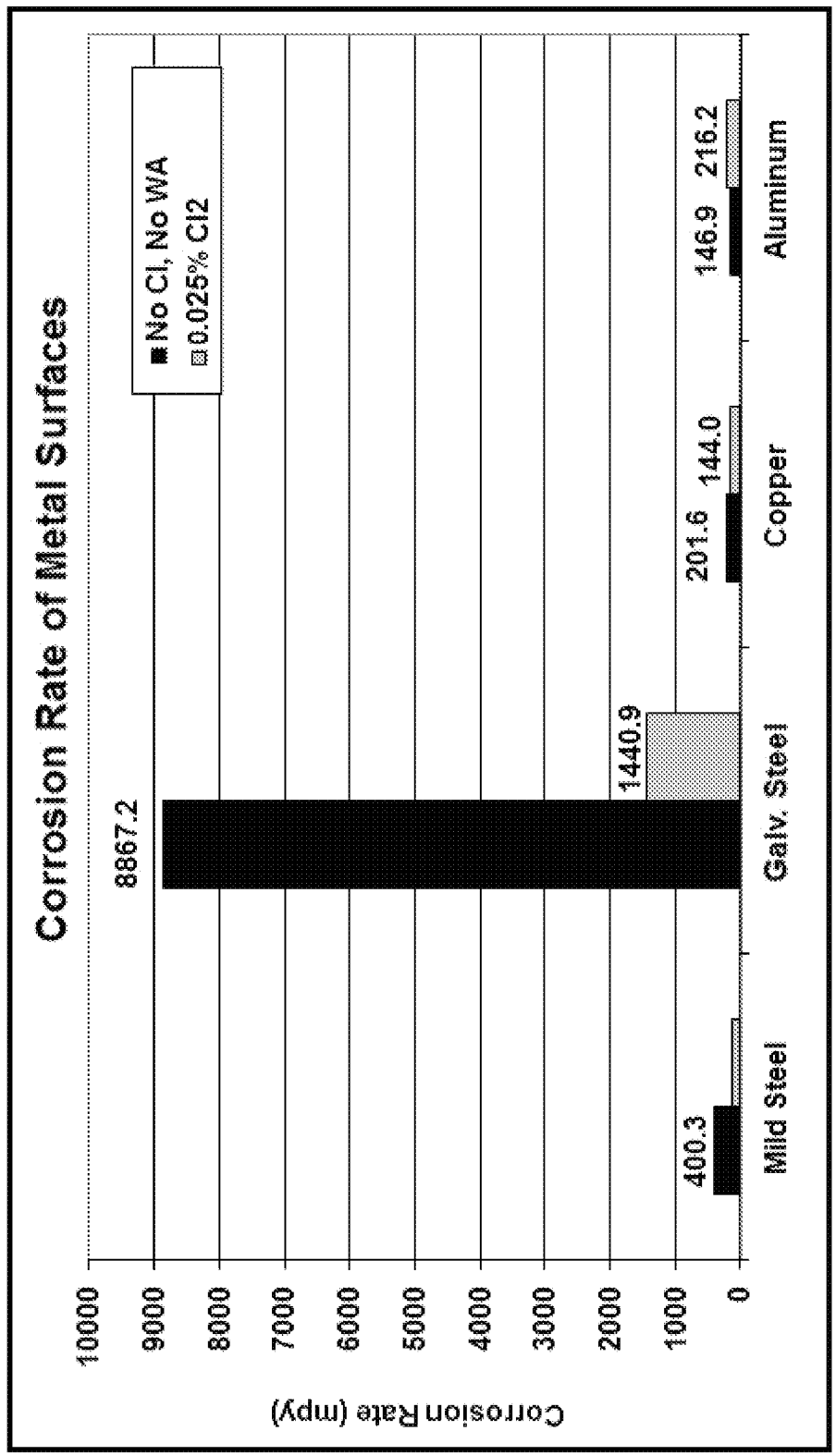
FIG. 12 is another bar graph illustrating corrosion amounts of various examples.

In FIG. 7, further corrosion test results are illustrated utilizing some of the solutions above. The solutions have a pH of about 0.5. The metal coupons are soaked for about one hour and the amount of corrosion is determined as described above. As shown, presence of the wetting agent along with the corrosion inhibitor has excellent anti-corrosion results, especially with galvanized steel, followed by mild steel, and then copper. Less impact is found with aluminum.

Figure 13:
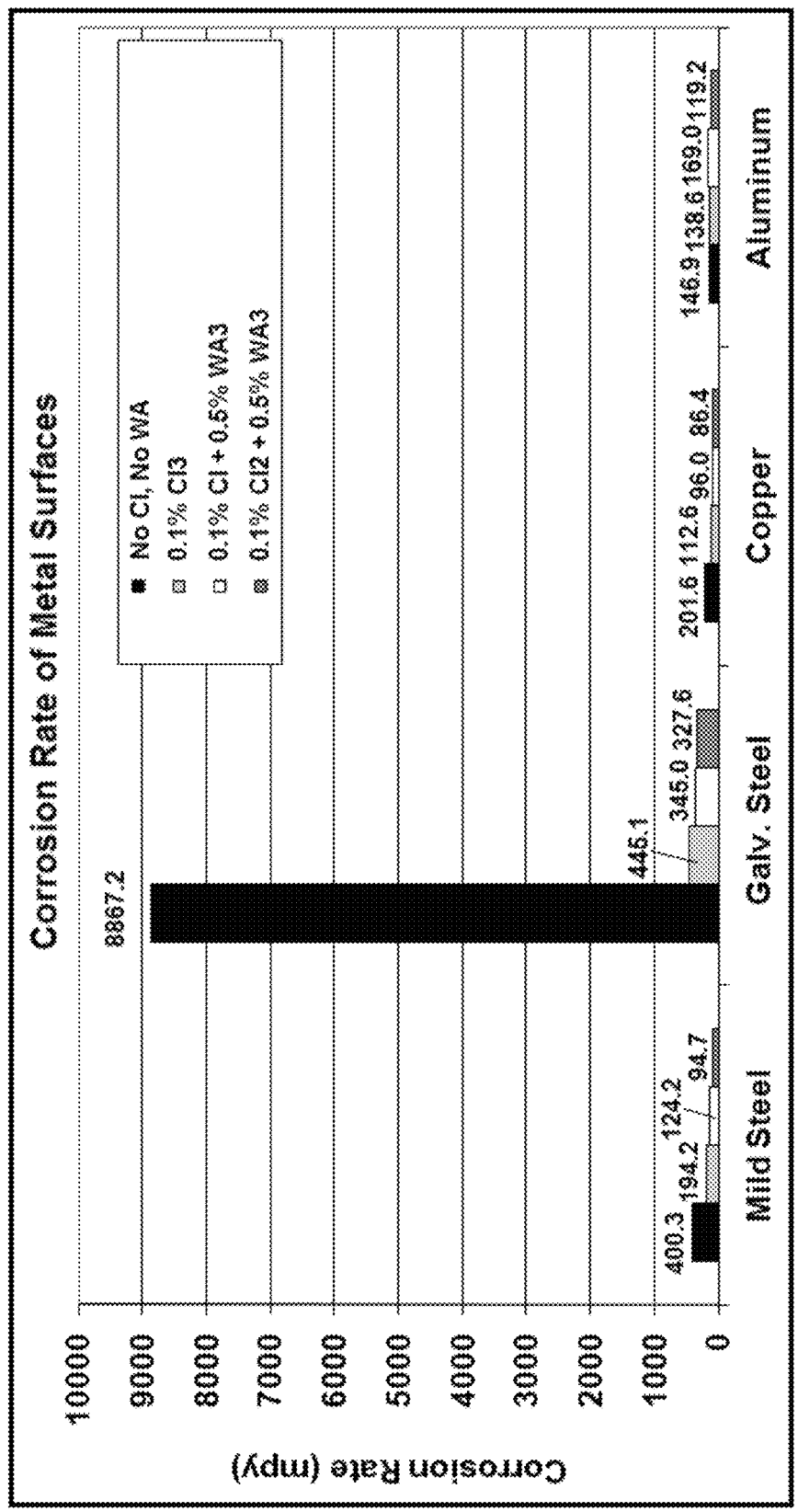
FIG. 13 is another bar graph illustrating corrosion amounts of various examples.
Figure 14:
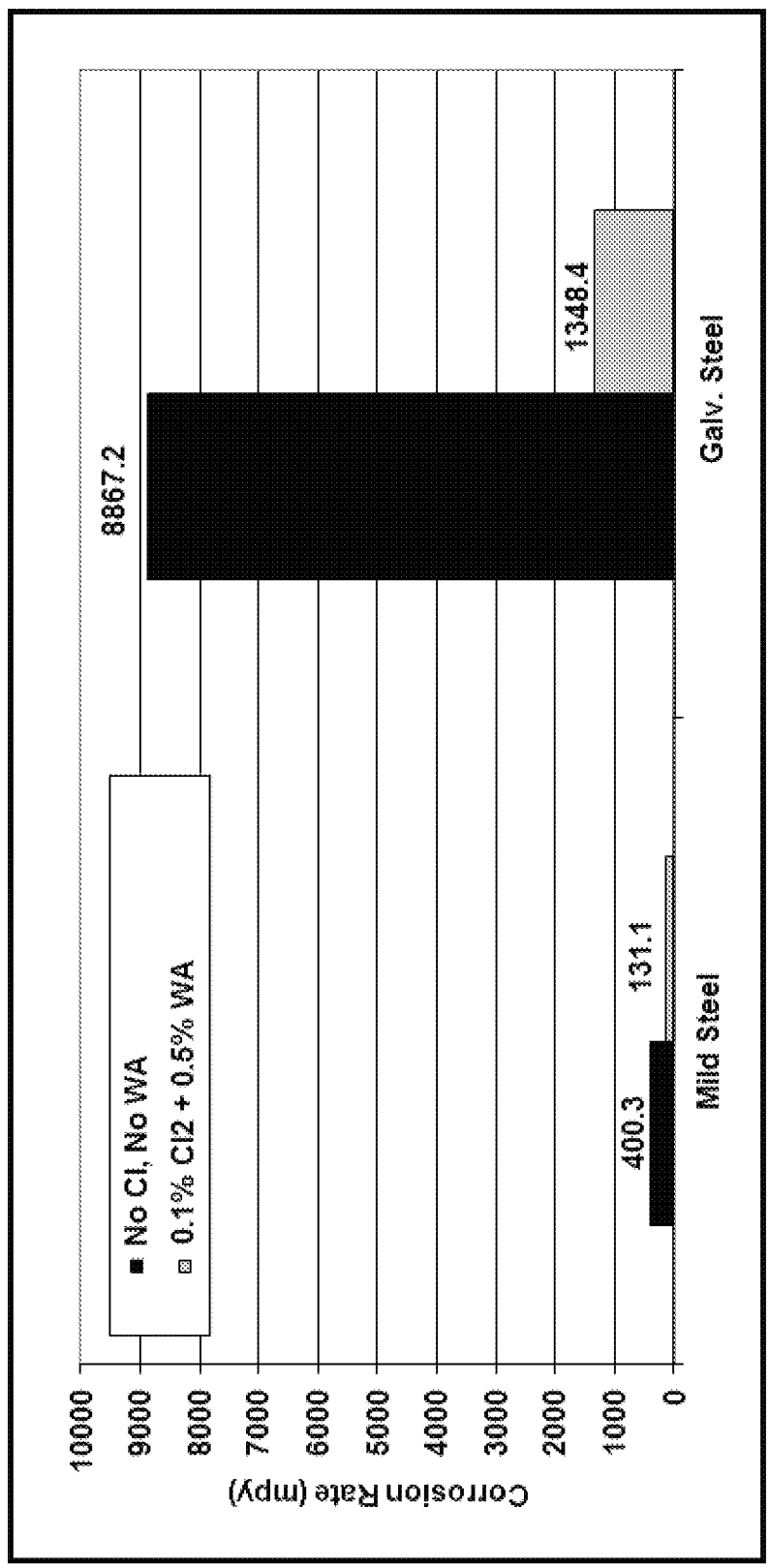
FIG. 14 is another bar graph illustrating corrosion amounts of various examples.
Figure 15:
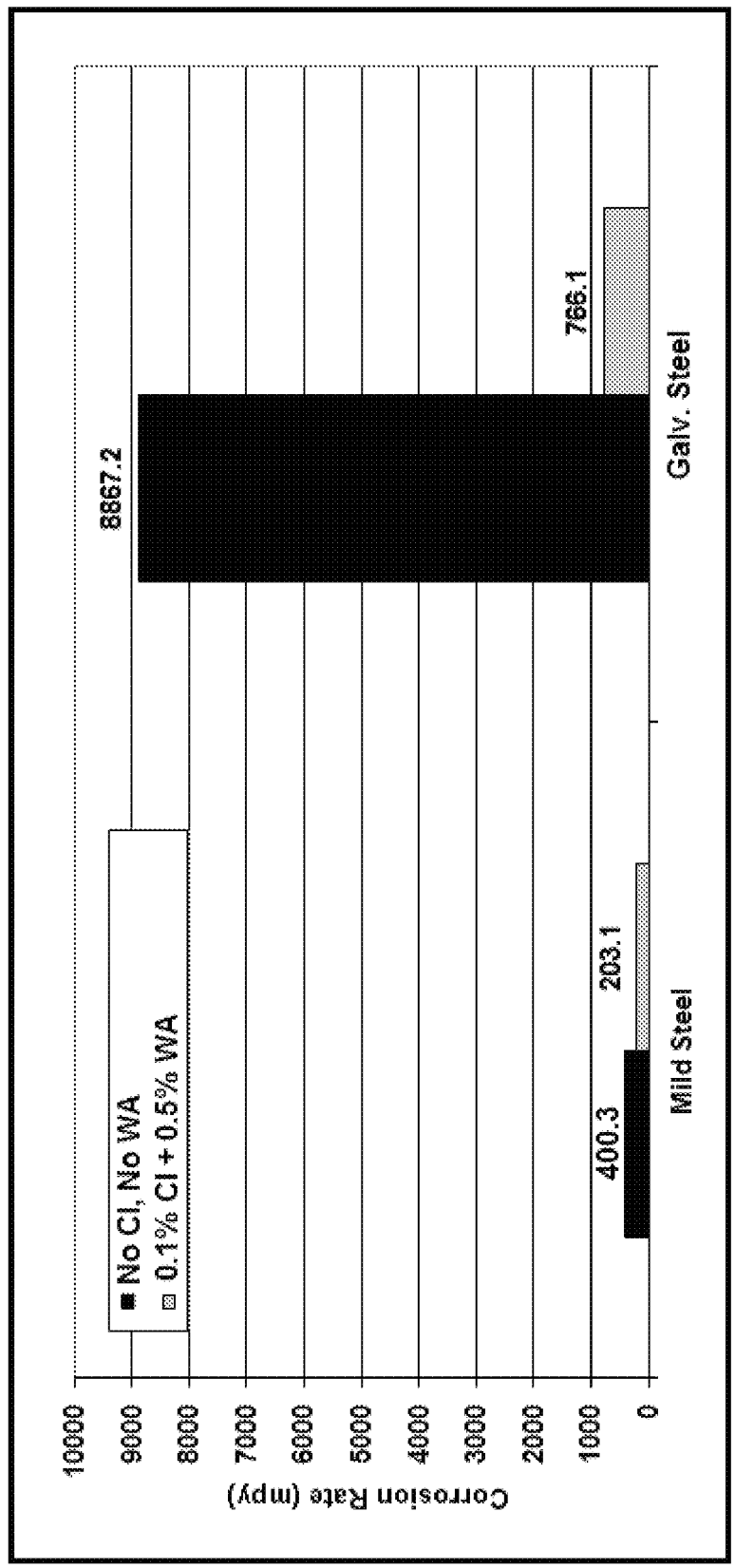
FIG. 15 is another bar graph illustrating corrosion amounts of various examples

Referring to FIGS. 8 through 15, additional corrosion results can be appreciated. In FIG. 13, it is generally shown that the combination of various wetting agents and corrosion inhibitors have excellent corrosion inhibition results. Calculating the corrosion rates with aluminum is notable. First, the generally accepted corrosion rate equation is as follows: corrosion rate (in mpy)=(mass loss in grams)*(534,000)/(metal density in grams/centimeters)*(coupon surface area in inches$^2$)*(time in hours). The density of aluminum is just ~2.8 g/cm$^3$, which is much lower than the density of the other metals evaluated. As such, a corrosion rate of 100 mpy for aluminum means a considerably lower mass loss than is observed when the corrosion rate for copper is 100 mpy. In other words, particularly low mass losses of aluminum are illustrated with these examples.

Figure 16:
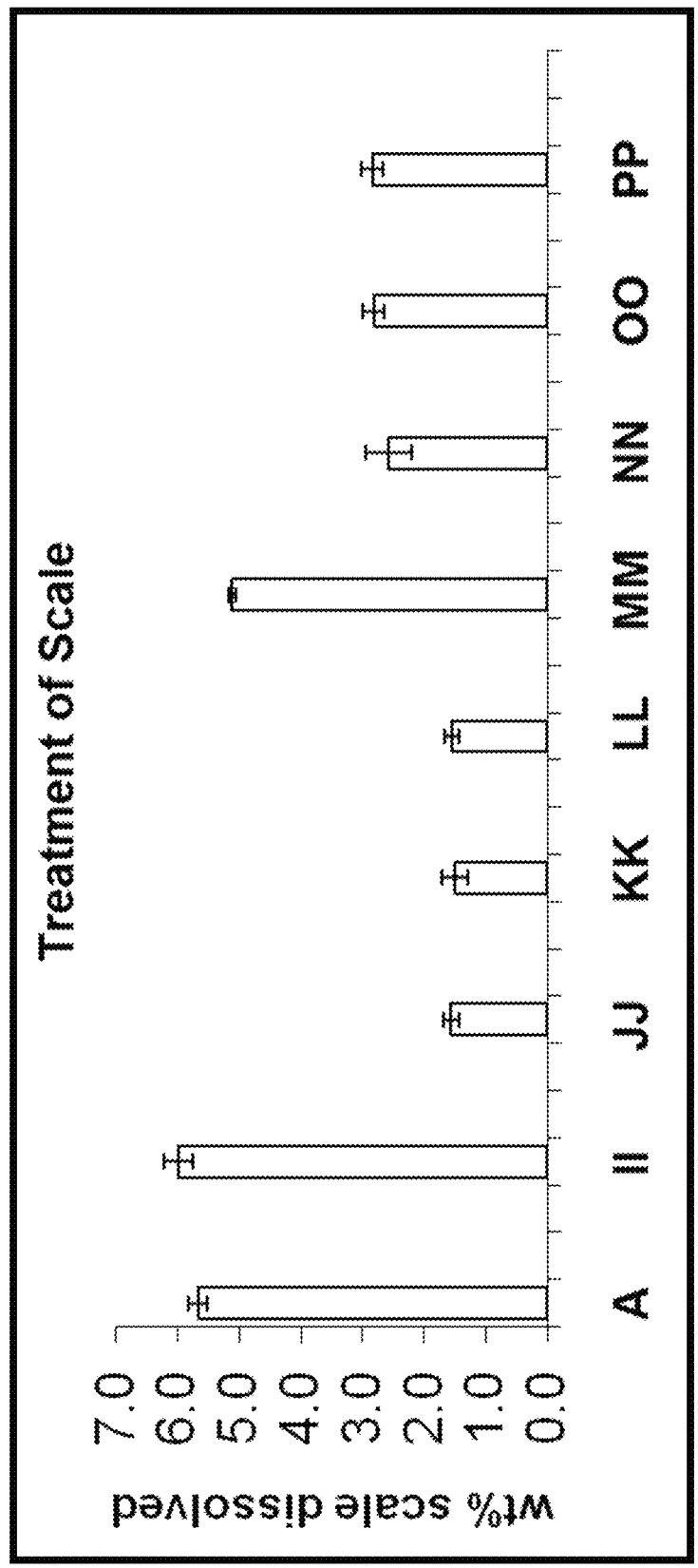
FIG. 16 is another bar graph illustrating dissolution of scale amounts of various examples.

Referring to FIG. 16, additional scale dissolution results are illustrated. Dissolution of scale is determined in the same manner as described above with the other inventive compositions. Comparative dilution A is the same as described above. Inventive composition II is the same as dilution A but also has 0.50 wt % of WA4 (as is) and 0.1 wt % of CI (as is). Inventive composition JJ is the same as dilution A but also has 0.50 wt % of Wetting Agent 8 (WA8) (as is) and 0.1 wt % of CI (as is). WA8 is a 100% active nonionic surfactant composed of an ethylene oxide adduct of a shorter, straight chain alcohol (relative to WA4). Inventive composition KK is the same as dilution A but also has 0.50 wt % of Wetting Agent 9 (WA9) (as is) and 0.1 wt % of CI (as is). WA9 is 100% active nonionic surfactant composed of an alkylene oxide adduct of a branched alcohol. Inventive composition LL is the same as dilution A but also has 0.50 wt % of Wetting Agent 10 (WA10) (as is) and 0.1 wt % of CI (as is). WA10 is 100% active nonionic surfactant composed of an alkylene oxide adduct of a branched alcohol.

Inventive compositions MM, NN, OO, and PP are similar to each of II, JJ, KK, and LL respectively, but include CI2 in place of CI in each occurrence. These solutions are all evaluated at 22° C.

Figure 17:
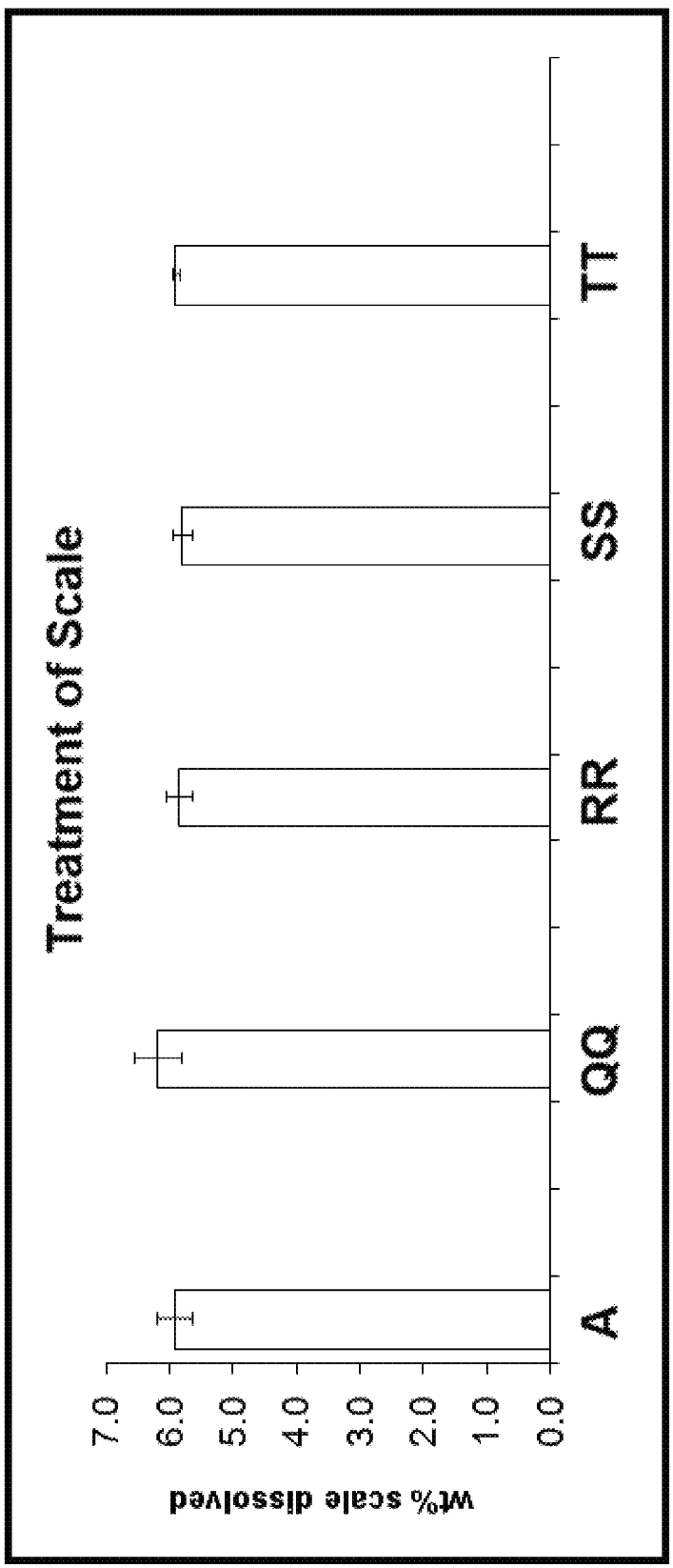
FIG. 17 is another bar graph illustrating dissolution of scale amounts of various examples.

Referring to FIG. 17, additional scale dissolution results are illustrated. Dissolution of scale is determined in the same manner as described above with the other inventive compositions. Comparative dilution A is the same as described above. Two concentrates are prepared to form inventive compositions QQ, RR, SS, and TT. Concentrate #1 includes 0.48 grams CI (as is), 1.26 grams WA4 (as is), and 23.28 grams AC (as is). Concentrate #2 includes 0.46 grams CI (as is), 2.37 grams WA4 (as is), and 22.2 grams AC (as is). Inventive composition QQ comprises 1 part Concentrate #1 and 19 parts water. Inventive composition RR is similar to QQ, but includes 20 parts water instead of 19 parts. Inventive composition SS comprises 1 part Concentrate #2 and 19 parts water. Inventive composition TT is similar to SS, but includes 20 parts water instead of 19 parts. These solutions are all evaluated at 22° C.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both singly and multiply dependent, is herein 000expressly contemplated.

What is claimed is:

1. A composition for dissolving and/or inhibiting deposition of scale on a surface of a system, said composition comprising:
   i) an acidic component comprising an alkanesulfonic acid;
   ii) a wetting agent comprising a surfactant; and iii) a corrosion inhibitor comprising an amphoteric surfactant;
wherein said alkanesulfonic acid is present in an amount of at least about 50 weight percent (wt %), said surfactant is present in an amount of from about 0.1 to about 30 wt %, and said amphoteric surfactant is present in an amount of from about 0.025 to about 20 wt %, each based on 100 wt % of said alkanesulfonic acid, said surfactant, and said amphoteric surfactant combined.

2. The composition as set forth in claim 1 wherein said alkanesulfonic acid is methanesulfonic acid (MSA).

3. The composition as set forth in claim 2 wherein said alkanesulfonic acid is present in an amount of from about 50 to about 99 wt % based on 100 wt % of said alkanesulfonic acid, said surfactant, and said amphoteric surfactant combined.

4. The composition as set forth in claim 1 wherein said surfactant of said wetting agent is a nonionic surfactant.

5. The composition as set forth in claim 1 wherein said surfactant of said wetting agent is an amphoteric surfactant different from said amphoteric surfactant of said corrosion inhibitor.

6. The composition as set forth in claim 1 wherein said surfactant of said wetting agent is an alcohol alkoxylate.

7. The composition as set forth in claim 1 wherein said surfactant of said wetting agent is present in an amount of from about 1 to about 25 wt % based on 100 wt % of said alkanesulfonic acid, said surfactant, and said amphoteric surfactant combined.

8. The composition as set forth in claim 1 wherein said amphoteric surfactant of said corrosion inhibitor is a propionate.

9. The composition as set forth in claim 8 wherein said amphoteric surfactant of said corrosion inhibitor is present in an amount of from about 0.025 to about 10 wt based on 100 wt % of said alkanesulfonic acid, said surfactant, and said amphoteric surfactant combined.

10. The composition as set forth in claim 1 further comprising water.

11. The composition as set forth in claim 10 wherein said water is present in an amount of at least 75 parts by weight based on 100 parts by weight of said composition.

12. The composition as set forth in claim 1 wherein the scale comprises calcium carbonate.

13. The composition as set forth in claim 1 wherein the surface comprises a metal.

14. The composition as set forth in claim 1 wherein the system is a heat transfer system.

15. A composition for dissolving and/or inhibiting deposition of scale on a surface of a system, said composition comprising:
i) an acidic component comprising an alkanesulfonic acid;
ii) a wetting agent comprising a surfactant;
iii) a corrosion inhibitor comprising an amphoteric surfactant; and
iv) optionally, water;
wherein said alkanesulfonic acid is present in an amount of at least about 50 weight percent (wt %), said wetting agent surfactant is present in an amount of from about 0.1 to about 30 wt %, and said amphoteric surfactant is present in an amount of from about 0.025 to about 20 wt %, each based on 100 wt % of said alkanesulfonic acid, said wetting agent surfactant, and said amphoteric surfactant combined;
wherein said alkanesulfonic acid is methanesulfonic acid (MSA);
wherein said surfactant of said wetting agent is selected from the group consisting of; a) a nonionic surfactant different from component c),
b) an amphoteric surfactant different from said amphoteric surfactant of said corrosion inhibitor, or
c) an alcohol alkoxylate; and
wherein said amphoteric surfactant of said corrosion inhibitor is a propionate.

16. A method of dissolving and/or inhibiting the deposition of scale on a surface of a system, said method comprising the step of bringing the surface of the system into contact with a composition comprising:
i) an acidic component comprising an alkanesulfonic acid;
ii) a wetting agent comprising a surfactant; and
iii) a corrosion inhibitor comprising an amphoteric surfactant;
wherein the alkanesulfonic acid is present in an amount of at least about 50 weight percent (wt %), the surfactant is present in an amount of from about 0.1 to about 30 wt %, and the amphoteric surfactant is present in an amount of from about 0.025 to about 20 wt %, each based on 100 wt % of the alkanesulfonic acid, the surfactant, and the amphoteric surfactant combined.

17. The method as set forth in claim 16 wherein the composition further comprises water in an amount of at least 75 parts by weight based on 100 parts by weight of the composition.

18. The method as set forth in claim 16 wherein the scale comprises calcium carbonate.

19. The method as set forth in claim 16 wherein the surface comprises a metal.

20. The method as set forth in claim 16 wherein the system is a heat transfer system.

* * * * *